(12) United States Patent
Aas et al.

(10) Patent No.: US 8,136,723 B2
(45) Date of Patent: Mar. 20, 2012

(54) CASH HANDLING

(75) Inventors: Per Christian Aas, Oslo (NO);
John-Haakon Lippert, Klokkarstua (NO)

(73) Assignee: Scan Coin AB, Malmo (SE)

( * ) Notice: Subject to any disclaimer, the term of this patent is extended or adjusted under 35 U.S.C. 154(b) by 0 days.

(21) Appl. No.: 13/107,000

(22) Filed: May 13, 2011

(65) Prior Publication Data
US 2011/0259706 A1    Oct. 27, 2011

Related U.S. Application Data

(60) Continuation of application No. 12/290,460, filed on Oct. 30, 2008, now abandoned, which is a division of application No. 11/673,796, filed on Feb. 12, 2007, now abandoned, which is a continuation of application No. PCT/SE2006/000195, filed on Feb. 10, 2006.

(60) Provisional application No. 60/773,123, filed on Feb. 13, 2006.

(51) Int. Cl.
*G07F 19/00* (2006.01)

(52) U.S. Cl. ........................ 235/379; 235/380

(58) Field of Classification Search .................. 235/379, 235/375, 380
See application file for complete search history.

(56) References Cited

U.S. PATENT DOCUMENTS

| | | | |
|---|---|---|---|
| 76,492 A | 4/1868 | Meaker | |
| 346,564 A | 8/1886 | Seegmueller | |
| 2,109,658 A | 3/1938 | Zierick | |
| 2,863,464 A | 12/1958 | Hewitt et al. | |
| 3,038,157 A | 6/1962 | Simjian | |
| 3,131,702 A | 5/1964 | Buchholz et al. | |
| 3,731,695 A | 5/1973 | Meijer | |
| 3,970,992 A | 7/1976 | Boothroyd et al. | |
| 4,010,766 A | 3/1977 | Bowles et al. | |
| 4,108,518 A | 8/1978 | Angst | |
| 4,150,740 A | 4/1979 | Douno | |
| 4,286,703 A | 9/1981 | Schuller et al. | |
| 4,304,247 A | 12/1981 | Hasegawa | |
| 4,337,864 A | 7/1982 | McLean | |
| 4,403,900 A | 9/1983 | Thomas | |
| 4,412,550 A | 11/1983 | Watanabe et al. | |
| 4,479,049 A | 10/1984 | Hirose | |
| 4,541,057 A | 9/1985 | Hagiwara | |
| 4,558,712 A | 12/1985 | Sentoku et al. | |

(Continued)

FOREIGN PATENT DOCUMENTS

CA    2299747    9/2001

(Continued)

OTHER PUBLICATIONS

International Preliminary Report on Patentability for PCT Application No. PCT/SE2004/001749, Filed Nov. 29, 2004.

(Continued)

*Primary Examiner* — Karl D. Frech
(74) *Attorney, Agent, or Firm* — Womble Carlyle Sandridges & Rice LLP

(57) ABSTRACT

Cash handling in a cash handling system is described in terms of methods and arrangements that interact by exchanging cash as well as information signals. A cash transport unit is configured to receive, store and provide cash, preferably in the form of notes. The transport units connect with ATM's, shops, vehicles as well as cash docking stations. Information flows among the entities of the system, between the transport units, the shops, the vehicles, the docking stations, a transport service control center, cash centers as well as banks.

14 Claims, 8 Drawing Sheets

U.S. PATENT DOCUMENTS

| | | |
|---|---|---|
| 4,632,621 A | 12/1986 | Cable |
| 4,687,089 A | 8/1987 | Wuethrich |
| 4,697,071 A | 9/1987 | Hiraoka et al. |
| 4,733,765 A | 3/1988 | Watanabe |
| 4,775,783 A | 10/1988 | Sasaki et al. |
| 4,866,254 A | 9/1989 | Okayama et al. |
| 4,897,984 A | 2/1990 | Sentoku et al. |
| 4,943,257 A | 7/1990 | Nilsson et al. |
| 4,946,341 A | 8/1990 | Parsley et al. |
| 5,005,688 A | 4/1991 | Yukimoto et al. |
| 5,030,165 A | 7/1991 | Nilsson et al. |
| 5,036,779 A | 8/1991 | Capraro |
| 5,064,074 A | 11/1991 | Edin et al. |
| 5,067,928 A | 11/1991 | Harris |
| 5,098,339 A | 3/1992 | Dabrowski |
| 5,135,433 A | 8/1992 | Watanabe et al. |
| 5,240,099 A | 8/1993 | Brown et al. |
| 5,302,811 A | 4/1994 | Fukatsu |
| 5,313,050 A | 5/1994 | Hiroki et al. |
| 5,316,517 A | 5/1994 | Chiba et al. |
| 5,340,967 A | 8/1994 | Martin et al. |
| 5,366,407 A | 11/1994 | Sentoku |
| 5,385,265 A | 1/1995 | Schlamp |
| 5,480,348 A | 1/1996 | Mazur et al. |
| 5,533,627 A | 7/1996 | Nordqvist |
| 5,542,880 A | 8/1996 | Geib et al. |
| 5,549,444 A | 8/1996 | Dubuit |
| 5,560,467 A | 10/1996 | Takemoto et al. |
| 5,564,546 A | 10/1996 | Molbak et al. |
| 5,593,149 A | 1/1997 | Kimura et al. |
| 5,620,079 A | 4/1997 | Molbak |
| 5,624,308 A | 4/1997 | Rumbach |
| 5,628,258 A | 5/1997 | Zwahlen et al. |
| 5,671,666 A | 9/1997 | Wenglar |
| 5,680,935 A | 10/1997 | Mistander et al. |
| 5,718,625 A | 2/1998 | Bointon |
| 5,755,437 A | 5/1998 | Ek |
| 5,799,767 A | 9/1998 | Molbak |
| 5,804,804 A | 9/1998 | Fukatsu et al. |
| 5,813,510 A | 9/1998 | Rademacher |
| 5,830,054 A | 11/1998 | Petri |
| 5,860,935 A | 1/1999 | Blaszynski et al. |
| 5,864,826 A | 1/1999 | Awatsu et al. |
| 5,873,446 A | 2/1999 | Wei |
| 5,875,259 A | 2/1999 | Mennie et al. |
| 5,883,371 A | 3/1999 | Meeker |
| 5,909,794 A | 6/1999 | Molbak et al. |
| 5,918,748 A | 7/1999 | Clark et al. |
| 5,923,413 A | 7/1999 | Laskowski |
| 5,960,103 A | 9/1999 | Graves et al. |
| 5,966,456 A | 10/1999 | Jones et al. |
| 5,975,273 A | 11/1999 | Zwahlen et al. |
| 5,982,918 A | 11/1999 | Mennie et al. |
| 5,997,395 A | 12/1999 | Geib et al. |
| 6,003,652 A | 12/1999 | Murata et al. |
| 6,006,989 A | 12/1999 | Ademmer et al. |
| 6,030,284 A | 2/2000 | Frank |
| 6,039,643 A | 3/2000 | Kurosawa et al. |
| 6,047,886 A | 4/2000 | Saltsov |
| 6,059,090 A | 5/2000 | Davis et al. |
| 6,061,121 A | 5/2000 | Holl et al. |
| 6,074,081 A | 6/2000 | Smith et al. |
| 6,080,056 A | 6/2000 | Karlsson |
| 6,082,616 A | 7/2000 | Lewis et al. |
| 6,086,471 A | 7/2000 | Zimmermann |
| 6,089,471 A | 7/2000 | Scholl |
| 6,098,837 A | 8/2000 | Izawa et al. |
| 6,101,266 A | 8/2000 | Laskowski et al. |
| 6,109,522 A | 8/2000 | Force et al. |
| 6,116,402 A | 9/2000 | Beach et al. |
| 6,128,402 A | 10/2000 | Jones et al. |
| 6,131,809 A | 10/2000 | Drescher et al. |
| 6,135,291 A | 10/2000 | Canella |
| 6,145,737 A | 11/2000 | Imai et al. |
| 6,168,001 B1 | 1/2001 | Davis |
| 6,170,818 B1 | 1/2001 | Eastman et al. |
| 6,170,822 B1 | 1/2001 | Kato et al. |
| 6,220,954 B1 | 4/2001 | Nguyen et al. |
| 6,237,739 B1 | 5/2001 | Mazur et al. |
| 6,241,244 B1 | 6/2001 | Modi |
| 6,289,261 B1 | 9/2001 | Heidel et al. |
| 6,290,050 B1 | 9/2001 | Mikami et al. |
| 6,290,070 B1 | 9/2001 | Graef et al. |
| 6,318,537 B1 | 11/2001 | Jones et al. |
| RE37,662 E | 4/2002 | Uchida et al. |
| 6,367,692 B1 | 4/2002 | Junkins et al. |
| 6,371,473 B1 | 4/2002 | Saltsov et al. |
| 6,422,458 B1 | 7/2002 | Katou et al. |
| 6,431,342 B1 | 8/2002 | Schwartz |
| 6,481,620 B1 | 11/2002 | Katou et al. |
| 6,494,776 B1 | 12/2002 | Molbak |
| 6,502,746 B1 | 1/2003 | Do et al. |
| 6,640,156 B1 | 10/2003 | Brooks et al. |
| 6,640,956 B1 | 11/2003 | Zwieg et al. |
| 6,655,584 B1 | 12/2003 | Lundblad |
| 6,712,219 B2 | 3/2004 | Kobayashi et al. |
| 6,736,251 B2 | 5/2004 | Molbak |
| 6,736,311 B2 | 5/2004 | Hägglund et al. |
| 6,758,316 B2 | 7/2004 | Molbak |
| 6,766,892 B2 | 7/2004 | Martin et al. |
| 6,854,581 B2 | 2/2005 | Molbak |
| 6,896,118 B2 | 5/2005 | Jones et al. |
| 6,896,177 B2 | 5/2005 | Carter |
| 6,934,688 B2 | 8/2005 | Carter |
| 6,976,570 B2 | 12/2005 | Molbak |
| 6,976,634 B2 | 12/2005 | Washington et al. |
| 6,981,633 B2 | 1/2006 | Inoue et al. |
| 7,028,827 B1 | 4/2006 | Molbak et al. |
| 7,036,651 B2 | 5/2006 | Tam et al. |
| 7,051,926 B2 | 5/2006 | Saltsov et al. |
| 7,073,707 B2 | 7/2006 | Carter |
| 7,131,580 B2 | 11/2006 | Molbak |
| 7,163,454 B2 | 1/2007 | Carter |
| 7,213,697 B2 | 5/2007 | Martin et al. |
| 7,244,175 B2 | 7/2007 | Adams et al. |
| 7,303,119 B2 | 12/2007 | Molbak |
| 2001/0004582 A1 | 6/2001 | Umeda et al. |
| 2002/0074394 A1 | 6/2002 | Birnie |
| 2002/0090906 A1 | 7/2002 | Abe et al. |
| 2002/0156734 A1 | 10/2002 | Yamamoto |
| 2003/0232588 A1 | 12/2003 | Karlsson |
| 2004/0029517 A1 | 2/2004 | Perkitny |
| 2004/0030622 A1 | 2/2004 | Ramos et al. |
| 2004/0181481 A1 | 9/2004 | Carter |
| 2004/0188221 A1 | 9/2004 | Carter |
| 2004/0200691 A1 | 10/2004 | Geib et al. |
| 2006/0060363 A2 | 3/2006 | Carter |
| 2006/0064379 A1 | 3/2006 | Doran et al. |
| 2006/0090909 A1 | 5/2006 | Carter |
| 2006/0144670 A1 | 7/2006 | Gunst et al. |
| 2007/0069007 A1 | 3/2007 | Molbak |
| 2009/0084841 A1 | 4/2009 | Washington et al. |
| 2010/0017017 A1 | 1/2010 | Adams et al. |
| 2010/0156036 A1 | 6/2010 | Bergeron et al. |

FOREIGN PATENT DOCUMENTS

| | | |
|---|---|---|
| CA | 2299827 | 9/2001 |
| DE | 3012243 | 10/1980 |
| DE | 3315982 | 8/1988 |
| DE | 3821947 | 1/1989 |
| DE | 91 16 582.2 U1 | 4/1993 |
| DE | 3250095 | 2/1995 |
| DE | 297 05 210 U1 | 7/1997 |
| DE | 19811909 | 9/1999 |
| DE | 102 36 258 A1 | 2/2004 |
| DE | 103 56 872 B3 | 2/2005 |
| EP | 0 173 119 B1 | 3/1986 |
| EP | 0 450 918 A2 | 10/1991 |
| EP | 0 493 127 | 12/1991 |
| EP | 0 536 126 B2 | 4/1993 |
| EP | 0 409 809 B1 | 3/1994 |
| EP | 0 596 612 A3 | 11/1994 |
| EP | 0 692 599 A1 | 1/1996 |
| EP | 0 700 553 B1 | 3/1996 |
| EP | 0 615 643 B1 | 7/1996 |
| EP | 0 734 001 A2 | 9/1996 |
| EP | 0 803 844 A2 | 10/1997 |

| | | |
|---|---|---|
| EP | 0 831 431 A2 | 3/1998 |
| EP | 0 841 641 A2 | 5/1998 |
| EP | 0 881 605 | 12/1998 |
| EP | 0 911 769 | 4/1999 |
| EP | 0 940 781 A1 | 9/1999 |
| EP | 0 682 326 B1 | 1/2000 |
| EP | 1 223 562 A1 | 6/2000 |
| EP | 1 020 818 A1 | 7/2000 |
| EP | 1 037 174 A1 | 9/2000 |
| EP | 1 069 540 A2 | 1/2001 |
| EP | 1 130 551 | 9/2001 |
| EP | 0 795 842 B1 | 6/2002 |
| EP | 1 291 831 A2 | 3/2003 |
| EP | 1 308 908 A2 | 5/2003 |
| EP | 1 378 869 A2 | 1/2004 |
| EP | 1 391 850 A2 | 2/2004 |
| EP | 1 396 821 A1 | 3/2004 |
| EP | 1 510 979 | 8/2004 |
| EP | 1 388 821 B1 | 10/2006 |
| EP | 1 008 965 | 2/2007 |
| FR | 2 538 933 | 7/1984 |
| FR | 2838932 | 10/2003 |
| GB | 2 071 059 | 2/1980 |
| GB | 2 147 443 | 5/1985 |
| GB | 2 208 738 | 4/1989 |
| GB | 2 217 086 | 10/1989 |
| GB | 2 246 656 A | 2/1992 |
| GB | 2 278 221 | 11/1994 |
| GB | 2 310 306 | 8/1997 |
| GB | 2 327 795 | 2/1999 |
| GB | 2 335 775 | 9/1999 |
| GB | 2 369 228 | 5/2002 |
| JP | 52049097 | 4/1977 |
| JP | 62-114092 | 5/1987 |
| JP | 62-192469 | 7/1987 |
| JP | 62-209695 | 9/1987 |
| JP | 64-31286 | 2/1989 |
| JP | 04-205088 | 7/1992 |
| JP | 05-006475 | 1/1993 |
| JP | 08-335287 | 12/1996 |
| JP | 9-147181 | 6/1997 |
| JP | 10-120006 | 5/1998 |
| JP | 11-219468 | 8/1999 |
| JP | 2001-093019 | 4/2001 |
| JP | 2002-261461 | 9/2002 |
| SE | 504 813 | 4/1997 |
| SE | 511 607 | 10/1999 |
| SE | 520 989 | 9/2003 |
| SE | 521 635 | 11/2003 |
| WO | WO 90/09646 | 8/1990 |
| WO | WO 91/07734 | 5/1991 |
| WO | WO 92/11953 | 7/1992 |
| WO | WO 93/10511 | 5/1993 |
| WO | WO 95/13596 | 5/1995 |
| WO | WO 95/23387 | 8/1995 |
| WO | WO 95/30215 | 11/1995 |
| WO | WO 96/36933 | 11/1996 |
| WO | WO 97/07485 | 2/1997 |
| WO | WO 97/25692 | 7/1997 |
| WO | WO 97/43739 | 11/1997 |
| WO | WO 99/05624 | 2/1999 |
| WO | WO 99/33030 | 7/1999 |
| WO | WO 00/31670 | 6/2000 |
| WO | WO 00/31694 | 6/2000 |
| WO | WO 00/31696 | 6/2000 |
| WO | WO 00/37317 | 6/2000 |
| WO | WO 00/48137 | 8/2000 |
| WO | WO 00/67217 | 11/2000 |
| WO | WO 00/75766 | 12/2000 |
| WO | WO 01/04771 | 1/2001 |
| WO | WO 01/48705 | 7/2001 |
| WO | WO 01/62634 | 8/2001 |
| WO | WO 01/65493 | 9/2001 |
| WO | WO 02/19289 | 3/2002 |
| WO | WO 02/27670 | 4/2002 |
| WO | WO 02/073548 | 9/2002 |
| WO | WO 02/082384 | 10/2002 |
| WO | WO 03/052700 | 6/2003 |
| WO | WO 2004/013819 | 2/2004 |
| WO | WO 2004/019285 | 3/2004 |
| WO | WO 2004/063065 | 7/2004 |
| WO | WO 2004/070668 | 8/2004 |
| WO | WO 2004/097754 | 11/2004 |
| WO | WO 2006/041357 | 4/2006 |
| WO | WO 2006/041358 | 4/2006 |
| WO | WO 2007/037744 | 4/2007 |
| WO | WO 2007/037745 | 4/2007 |
| WO | WO 2008/025429 | 3/2008 |

OTHER PUBLICATIONS

International Preliminary Report on Patentability for PCT Application No. PCT/SE2005/001120, Filed Jun. 7, 2005.
International Preliminary Report on Patentability for PCT Application No. PCT/GB2006/003435, Filed Sep. 15, 2006.
Written Opinion for PCT Application No. PCT/GB2006/003435, Filed Sep. 15, 2006.
Security Cash Register, IBM Technical Disclosure Bulletin http://www.delphion.com/tdbs/tdb?o (1973).
Ascom Twin Safe advertising brochure, Oct. 1999.
Bankinfo.com publication, May 2, 2001.
IBM Technical Disclosure Bulletin vol. 15, No. 12, May, 1973.
AST 9006, advertising brochure, 2001.
Restriction Office Action dated Dec. 14, 2007, from U.S. Appl. No. 11/673,796, filed Feb. 12, 2007.
Response to Dec. 14, 2007 Restriction Office Action filed Jan. 14, 2008, from U.S. Appl. No. 11/673,796, filed Feb. 12, 2007.
Office Action dated Apr. 30, 2008, from U.S. Appl. No. 11/673,796, filed Feb. 12, 2007.
Response to Apr. 30, 2008 Office Action filed Oct. 30, 2008, from U.S. Appl. No. 11/673,796, filed Feb. 12, 2007.
Office Action dated Jan. 19, 2011 from U.S. Appl. No. 12/269,476, filed Nov. 12, 2008.
Supplementary Partial European Search Report dated Jun. 29, 2011, from co-pending European patent application No. 06716886.4.

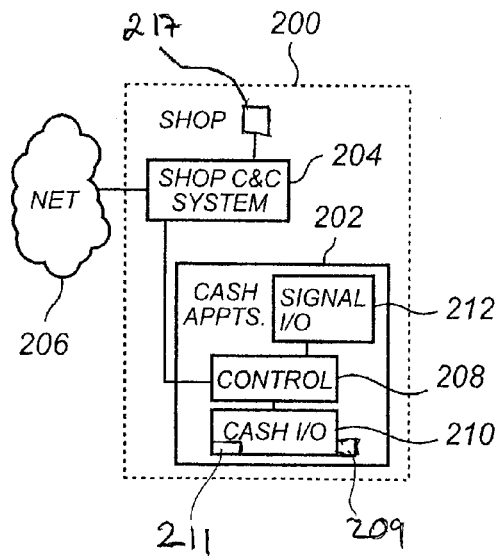
Fig. 2
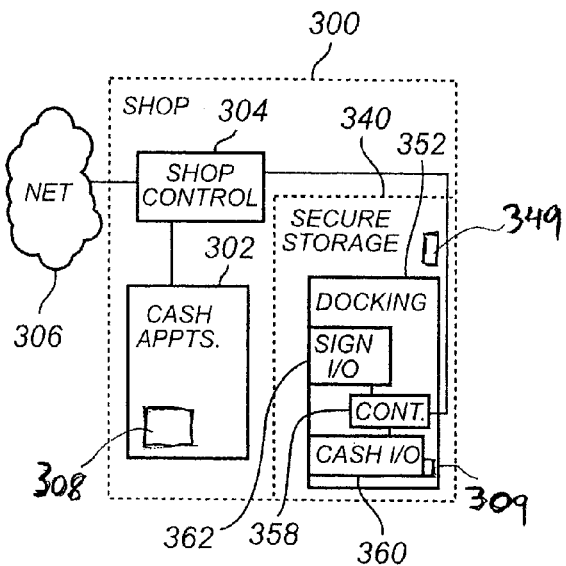
Fig. 3
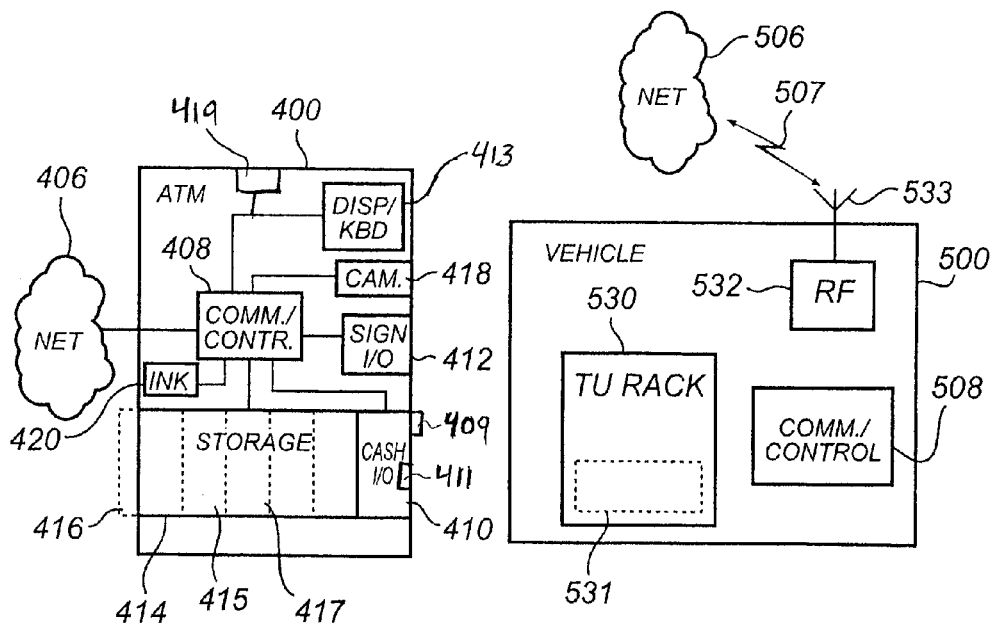
Fig. 4
Fig. 5

CASH HANDLING

CROSS-REFERENCE TO RELATED APPLICATIONS

This application is a continuation application of U.S. patent application Ser. No. 12/290,460, filed Oct. 30, 2008. The '460 application is a divisional application of U.S. patent application Ser. No. 11/673,796, filed Feb. 12, 2007. The '796 application is a continuation of International Application No. PCT/SE2006/000195, filed Feb. 10, 2006, and designating the United States, and the '796 application claims the benefit of U.S. Provisional Patent Application No. 60/773,123, filed on Feb. 13, 2006.

INCORPORATION BY REFERENCE

The entire disclosure of U.S. patent application Ser. No. 12/290,460, the entire disclosure of U.S. patent application Ser. No. 11/673,796, the entire disclosure of International Application No. PCT/SE2006/000195, and the entire disclosure of U.S. Provisional Patent Application No. 60/773,123 are incorporated herein in their entirety by this reference.

TECHNICAL FIELD

The present application relates to handling of cash in a cash handling system comprising a plurality of interacting entities. Specifically, the handling of cash involves transporting cash between system entities as well as transmitting information signals between cash handling system entities.

BACKGROUND

Cash, not least in the form of bank notes, will continue to fulfill a large and vital role or function in payment systems all around the world for a long time to come. Although electronic payment systems in which cash in the form of bank notes have been eliminated are becoming more and more widespread, there is still a large need to cater for transactions that are simple and have no need for complex electronic equipment.

The simplicity of using cash for performing transactions is, however, closely and inevitably coupled to problems of how to prevent unauthorized access to the cash. Such problems are relevant with respect to all stages involved when preparing for and making any transaction involving cash. For example, when preparing for and when performing transport of cash from a shop, retail location or automatic teller machine (ATM) to a cash depository, such as a cash center, or financial institute, such as a bank, there are typically a large number of procedures and protection systems involved in order to prevent unauthorized access to the cash. Needless to say, these procedures are typically very complicated and involve the use of expensive equipment and staff.

Further related to these, more direct, problems of preventing unauthorized physical access to the cash, are problems of how to simplify and facilitate for interacting entities in a cash handling system in terms of handling ownership and responsibility with respect to cash during different stages of controlling flow of cash in a cash handling system.

Such problems and related problems have been discussed in the prior art. Examples of such disclosures include US patent application publication 2004/0030622 in which a currency management method and system is described. A currency transportation plan is established that includes a currency delivery schedule for transport of currency between nodes in a system. The schedule is established using information pertaining to a currency inventory, a forecast for currency demand and costs of handling currency.

Moreover, U.S. Pat. No. 6,655,584 discloses a system for handling banknotes within a geographically limited area. An information center communicates with ATMs to exchange data relating to banknotes. Transport vehicles transport the banknotes to and from the machines in response to orders from the information center issued on the basis of information sent from the machines to the information center.

SUMMARY OF THE INVENTION

Although relating to cash handling in general, the cited prior art disclosures are more directed to solving problems of how to minimize manual handling of bank notes, and provides solutions that involve creating schedules and plans for transporting currency in currency management systems.

An object of the present invention is hence to overcome drawbacks related to cash handling disclosed in the prior art.

In addition to providing a solution to a general problem of how to minimize manual handling of currency, the present invention addresses a more specific problem of how to improve security in cash handling while at the same time providing flexible and cost effective cash handling in a cash handling system.

Hence, in one aspect, the present invention provides a cash transport apparatus and a method of controlling operation of such a cash transport apparatus.

That is, a method of controlling operation of a cash transport apparatus in a cash handling system is provided. The cash transport apparatus is configured to store cash, receive and dispense cash and exchange information with a plurality of cash handling entities in the cash handling system. The method comprises establishing a first signaling connection with a first cash handling entity, communicating first information signals between the cash transport apparatus and the first cash handling entity, and controlling flow of cash between the cash transport apparatus and the first cash handling entity. This is followed by establishing a second signaling connection with a second cash handling entity, communicating second information signals between the cash transport apparatus and the second cash handling entity, and controlling flow of cash between the cash transport apparatus and the second cash handling entity.

By not being an integrated part or sub-unit of any entity in the cash handling system and thereby not dedicated for use in connection with only one entity, which is typically the situation with respect to prior art transport systems, a transport unit and control of a transport unit according to the invention is very advantageous in terms of versatility of use. As a result of such versatility other advantages become apparent, such as efficiency in terms of cost and speed. Prior to the control of the flow of cash with the first cash handling entity, control of engagers may be performed to establish a mechanical engagement between a cash input and output unit in the transport apparatus and the first cash handling entity. Moreover, after the control of the flow of cash with the first cash handling entity, control of engagers may be performed to release the mechanical engagement between a cash input and output unit in the transport apparatus and the first cash handling entity, and prior to the control of the flow of cash with the second cash handling entity, control of engagers may be performed to establish a mechanical engagement between a cash input and output unit in the transport apparatus and the second cash handling entity, and after the control of the flow of cash with the second cash handling entity, control of engagers may be performed to release the mechanical engagement between a cash input and output unit in the transport apparatus and the second cash handling entity.

The establishing of any of the first and the second signaling connection may comprise communication of an identifier of any of the cash transport apparatus, the first cash handling entity and the second cash handling entity.

Any of the first information signals and the second information signals may comprise information pertaining to a cash flow amount and the control of flow of cash between the cash transport apparatus and any of the first and second cash handling entities may comprise flow control in dependence on the information pertaining to cash flow amount. Moreover, the control of flow of cash between the cash transport apparatus and any of the first and second cash handling entities may comprise controlling recycling of cash. That is, cash dispensed from one entity into the transport apparatus may be dispensed into another entity. The information pertaining to cash flow amounts that is exchanged between the transport apparatus and entities in the system facilitates this recycling operation and by this provides a further advantage of efficient cash storage use.

The communication of first information signals and the control of flow of cash between the cash transport apparatus and the first cash handling, entity may be performed at least partly in a simultaneous manner. Similarly, the communication of second information signals and the control of flow of cash between the cash transport apparatus and the second cash handling entity may be performed at least partly in a simultaneous manner.

The communication of any of the first information signals and the second information signals may comprise communication of confirmation information subsequent to the control of flow of cash between the cash transport apparatus and the first and second cash handling entity, respectively. The confirmation information may comprise information pertaining to a cash flow amount of any of the flows of cash between the cash transport apparatus and the first and second cash handling entity, respectively.

The information pertaining to a cash flow amount of any of the flows of cash between the cash transport apparatus and the first and second cash handling entity, respectively, may also comprise instructions for changing ownership of a cash amount. That is, as a result of the instructions to change ownership, when these have been acted upon by, e.g., a bank, a bank account belonging to an entity from which cash has been conveyed may be credited with the amount of cash that has been conveyed to the transport apparatus. This is advantageous in that it may clarify the distribution of responsibility for specific amounts of cash. For example, an owner of an entity that has submitted cash to a transport apparatus, e.g. a shop keeper having a cash handling apparatus, will get an increased feeling of comfort knowing that the cash that has left his shop is already credited to his bank account.

Detection of at least one note having a predetermined type may also be performed, and depending on the detection, the control of flow of cash may then comprise controlling rejection of the at least one note having the predetermined type. The predetermined type of note may be a potentially counterfeit note.

In some embodiments the first cash handling entity is a cash docking station and the second cash handling entity is an ATM.

In some embodiments the first cash handling entity is a cash docking station and the second cash handling entity is a cash handling apparatus.

In some embodiments the first cash handling entity is a cash handling apparatus and the second cash handling entity is an ATM.

In some embodiments the first cash handling entity is a cash handling apparatus and the second cash handling entity is a cash handling apparatus.

In some embodiments the first cash handling entity is an ATM and the second cash handling entity is an ATM.

Communicating first information signals between the cash transport apparatus and the first cash handling entity may comprise communicating information pertaining to instructions from a financial institute to provide cash to an ATM.

The instructions from a financial institute to provide cash to an ATM may comprise information including any of an ATM identity, a geographical location of an ATM, an amount of cash to provide to an ATM, a time limit.

Communicating first information signals between the cash transport apparatus and the first cash handling entity may comprise communicating information pertaining to instructions from a financial institute to retrieve cash from an ATM.

The instructions from a financial institute to retrieve cash from an ATM may comprise instructions to retrieve any of unfit notes not valid for circulation and potentially counterfeit notes.

In some embodiments, a third signaling connection is established with a third entity and communicating third information signals between the cash transport apparatus and the third entity. The third entity may be a vehicle configured to carry the cash transport apparatus and the signaling connection with the vehicle may be established via a transport unit rack configured to convey signals between the cash transport apparatus and the vehicle. The third entity may also be a cash center as well as a transport service control center.

By utilizing a cash transport apparatus according to the invention in connection with a vehicle, enhanced security of the overall flow of cash in the cash handling system is obtained. Weak links along the cash flow path are avoided, which is in contrast to prior art solutions where, typically, exposure of notes to unauthorized parties is more or less possible, e.g. by the use of cash containers such as bags.

In case the third entity is a cash center, the signaling connection with the cash center may be established via a docking station configured to convey signals between the cash transport apparatus and the cash center.

The signaling connection with the third entity may furthermore be established via a vehicle configured to carry the cash transport apparatus and the signaling connection with the third entity may be established via a transport unit rack configured to convey signals between the cash transport apparatus and the vehicle.

The third information signals may comprise status information regarding the transport apparatus and the status information may comprise information pertaining to an amount of cash stored in the cash transport apparatus. The status information may also comprise information pertaining to a physical integrity of the transport apparatus and also comprise an alarm with respect to violation of the physical integrity of the transport apparatus and information pertaining to a status of an ink dye protection system in the transport apparatus and also comprise information pertaining to a geographic location of the transport apparatus.

In some embodiments, establishing any of the signaling connections may comprise signaling according to an authentication, authorization and accounting, AAA, protocol and may also comprise signaling according to a wireless communication protocol, such as a GSM/GPRS system, a WCDMA system and a CDMA2000 system.

In one aspect, the invention provides a computer program comprising software instructions that, when executed in a control unit, performs a method of controlling operation of a cash transport apparatus as described above.

Further, a cash transport apparatus for use in a cash handling system comprises a cash storage unit, a cash input and output unit and a control and communication unit. The apparatus is configured to establish a first signaling connection with a first cash handling entity, communicate first information signals between the cash transport apparatus and the first cash handling entity, control flow of cash between the cash transport apparatus and the first cash handling entity, establish a second signaling connection with a second cash handling entity, communicate second information signals between the cash transport apparatus and the second cash handling entity, and control flow of cash between the cash transport apparatus and the second cash handling entity.

The cash transport apparatus may be configured to connect with any of an ATM, a cash docking station and a cash handling apparatus as well as with a third entity in the cash handling system. Such a third entity may be any of a vehicle and a transport unit rack configured to convey signals between the cash transport apparatus and the vehicle.

The cash transport apparatus may also be configured to detect and communicate a status regarding the transport apparatus. The status may be any of an amount of cash stored in the cash transport apparatus, information pertaining to a physical integrity of the transport apparatus and information pertaining to an ink dye protection system in the transport apparatus. Moreover, the cash transport apparatus may also comprise a geographical location detection system and be further configured to communicate information pertaining to a geographical location of the transport apparatus.

The cash transport apparatus may be configured to perform signaling according to an authentication, authorization and accounting, AAA, protocol and also to perform signaling according to a wireless communication protocol utilized in a wireless communication system such as any of a GSM/GPRS system, a WCDMA system and a CDMA2000 system.

The cash transport apparatus may be configured with an enclosure comprising at least a secure compartment, where said secure compartment encloses at least the cash storage unit.

The cash transport apparatus may comprise a note validator configured in connection with the control and communication unit and the cash input and output unit to reject at least one predetermined type of notes. The type of notes to be rejected may comprise potentially counterfeit notes.

Numerous advantages are provided by such an inventive methods of controlling operation of a cash transport apparatus and a cash transport apparatus. For example, an improved overview in terms of monitoring of the total flow of cash in a cash handling system is provided. Scheduling and planning of the control of cash flow is facilitated. Fast and effective feedback of any errors and discrepancies with respect to the cash flow is obtained. The invention also provides an enhanced possibility to forecast current and future need for cash in any entity of the system.

In yet another aspect, the present invention provides a method of controlling flow of cash between a cash transport apparatus and an ATM in a cash handling system. The cash transport apparatus is configured to store cash, receive and dispense cash and exchange information with at least the ATM. The method comprises establishing a signaling connection between the cash transport apparatus and the ATM, controlling engagers to establish a mechanical engagement between a cash input and output unit in the ATM and the cash transport apparatus, controlling flow of cash between the cash transport apparatus and the ATM, communicating information signals between the cash transport apparatus and the ATM, and controlling engagers to release the mechanical engagement between the cash transport apparatus and the ATM.

The establishing of the signaling connection may comprise communication of an identifier of any of the cash transport apparatus and the ATM.

The information signals may comprise information pertaining to a cash flow amount and the control of flow of cash between the cash transport apparatus and the ATM may comprise flow control in dependence on said information pertaining to cash flow amount.

The control of flow of cash between the cash transport apparatus and ATM may comprise controlling recycling of cash.

The communication of information signals and the control of flow of cash between the cash transport apparatus and the may, at least partly, be performed simultaneously.

The communication of the information signals may comprise communication of confirmation information subsequent to the control of flow of cash between the cash transport apparatus and the ATM.

The confirmation information may comprise information pertaining to a cash flow amount of the flow of cash between the cash transport apparatus and the ATM.

The control of flow of cash between the cash transport apparatus and ATM may comprise controlling flow of cash out of the cash transport apparatus into the ATM.

The control of flow of cash between the cash transport apparatus and ATM may comprise controlling flow of cash out of the ATM into the cash transport apparatus.

The control of flow of cash out of the ATM may comprise control of flow of any of notes unfit for circulation, potentially counterfeit notes and surplus notes.

In one aspect, the invention provides a computer program comprising software instructions that, when executed in a control unit, performs a method of controlling flow of cash between a cash transport apparatus and an ATM as described above.

Furthermore, along the lines of this aspect, the present invention provides an automated teller machine, ATM, configured to interact with a cash transport apparatus in a cash handling system. The ATM comprises a cash storage unit, a cash input and output unit and a control and communication unit. The control and communication unit is configured to establish a signaling connection with the cash transport apparatus, control engagers to establish a mechanical engagement between the cash input and output unit and the cash transport apparatus, control flow of cash between the cash transport apparatus and the ATM, communicate information signals between the ATM and the cash transport apparatus, and control engagers to release the mechanical engagement with the cash transport apparatus.

The control and communication unit configured to control flow of cash between the cash transport apparatus and ATM may be configured to control recycling of cash, flow of cash into the ATM as well as being be configured to control flow of cash out of the ATM.

The control and communication unit may be configured to detect any of notes not desirable for dispensing, potentially counterfeit notes, unfit notes, foreign currency notes, small denomination notes and large denomination notes. The cash storage unit may furthermore be configured with respective storage units for any of these types of notes. Moreover, the control and communication unit may be configured to detect individual notes in the flow of cash into the ATM as being any of these types of notes.

The control and communication unit may be configured to control the storage unit to retain potentially counterfeit notes.

The ATM may further comprise an ink dye protection system.

An advantage of such an ATM is that it enables a high level of security in that unauthorized access to cash is prevented. This may be illustrated by noting that mechanical engagement and flow of cash is established between the cash transport apparatus and the cash input and output unit of the ATM. Such a configuration prevents unnecessary exposure of notes during transfer between the ATM and the transport unit. This is in contrast to prior art ATM systems where transport of cash is performed by the use of transport units that are configured as removable modules that are accessed and removed by opening an outer cover of the ATM.

An additional advantage is that, by re-filling an ATM with cash from a cash transport apparatus, increased security is obtained in that the risk of providing notes that are unfit for circulation, e.g. potentially counterfeit, as well as providing a wrong number of notes, to the ATM is reduced.

In yet another aspect, the present invention provides a docking station that is configured to convey cash between any cash transport unit.

Hence, the present invention provides a cash docking station for use in a cash handling system. The cash docking station comprises a cash input for receiving cash, a cash output for providing cash, and a signal communicator for exchanging information with at least one cash transport apparatus in the cash handling system and for controlling flow of cash between said cash input and said cash output.

The signal communicator may be mechanical as well as electric, optical and may be wireless as well as wire based. Any of the cash input and cash output may be configured to interact with a cash transport apparatus.

In other words, such a simple cash docking station allows input of cash from any suitable type of cash providing apparatus, including simple manual feeding of cash by hand as well as any cash transport unit such as a stacker box, a cash bag etc. Output of cash may be to a transport box, such as any transport box described above.

In yet another aspect, the present invention provides a docking station that is configured to convey cash between any cash transport unit.

Hence, the present invention provides a cash docking station for use in a cash handling system. The cash docking station comprises a cash input for receiving cash, a cash output for providing cash, a cash storage unit, a signal communicator for exchanging information with at least one cash transport apparatus in the cash handling system and for controlling flow of cash between said cash input and said cash output, and a controller for controlling operation of said signal communicator, said storage unit, said cash input and said cash output.

The cash docking station may be arranged between a first environment and a second environment, said first and second environments being configured such that they represent a respective first and second level of security and wherein the cash input is configured for access from the first environment and the cash output is configured for access from the second environment. For example, the cash docking station may be arranged in a wall at a cash center or in a wall in a vehicle.

The cash docking station may also be configured such that the cash storage unit is configured to perform any operation of note validation, note fitness sorting, denomination sorting, foreign denomination sorting, detection of facing and orientation.

Furthermore, along the lines of this aspect, the invention provides a method of controlling operation of a cash docking station in a cash handling system, the cash docking station being configured to store cash, receive and dispense cash and exchange information with a cash transport apparatus in the cash handling system. The method comprises the steps of establishing a signaling connection with a cash transport apparatus, controlling exchange of cash between the cash docking station and the cash transport apparatus, and communicating information signals between the cash docking station and the cash transport apparatus.

A cash docking station provides a number of advantages over prior art solutions. For example, a cash docking station may provide a more or less automated handling of cash early in the flow in a cash handling system, before reaching a cash center, for example already at a shop location or in a vehicle. This allows for an enhanced flexibility when controlling the flow of cash, as well as facilitating forecasting of various needs in the cash handling system, such as the need for specific amounts of cash at different entities in the system. In other words, the use of a docking station according to the invention enables quick re-direction of cash without a need to use a central location, such as a cash center, early in the flow of cash in the system. Large accumulations of cash may then be avoided to a larger extent than in prior art systems.

In one aspect, the invention provides a computer program comprising software instructions that, when executed in a control unit, performs a method of controlling operation of a cash docking station as described above.

In another aspect, the present invention provides a cash handling apparatus that is configured to operate in conjunction with a cash transport apparatus.

Hence, the present invention provides a cash handling apparatus configured to interact with a cash transport apparatus in a cash handling system. The cash handling apparatus comprises a cash storage unit, a cash input and output unit and a control and communication unit.

The control and communication unit is configured to establish a signaling connection with the cash transport apparatus, control engagers to establish a mechanical engagement between the cash input and output unit and the cash transport apparatus, control flow of cash between the cash transport apparatus and the cash handling apparatus, communicate information signals between the cash handling apparatus and the cash transport apparatus, and control engagers to release the mechanical engagement with the cash transport apparatus.

The control and communication unit configured to control flow of cash between the cash transport apparatus and cash handling apparatus may be configured to control recycling of cash, flow of cash into the cash handling apparatus as well as being be configured to control flow of cash out of the cash handling apparatus.

The control and communication unit may be configured to detect any of notes not desirable for dispensing, potentially counterfeit notes, unfit notes, foreign currency notes, small denomination notes and large denomination notes. The cash storage unit may furthermore be configured with respective storage units for any of these types of notes. Moreover, the control and communication unit may be configured to detect individual notes in the flow of cash into the cash handling apparatus as being any of these types of notes.

From the above description of different aspects of the invention it will be evident that one general advantage is that of enhanced security due to the essentially closed flow of cash between different entities and a transport apparatus. Cash is typically not accessible to any unauthorized party all along the flow of cash.

From the above it can be concluded that, in a general aspect, the present invention simply provides a cash handling system comprising any number of cash handling entities discussed above.

In another aspect, the present invention is the use of a cash transport apparatus for providing a cash transport service to any entity in a cash handling system. Such a transport service may comprise providing cash to an ATM and/or receiving cash from an ATM. Moreover, such a transport service may comprise providing cash to a cash handling apparatus in a shop and/or receiving cash from a cash handling apparatus in a shop.

Use of a cash transport apparatus may also entail, in a case where the transport apparatus is configured as a cash deposit apparatus, providing a cash deposit service to any entity, such as a shop, in a cash handling system.

In other words, a cash transport apparatus according to the present invention provides a great deal of versatility in terms of use. For example, a cash transport apparatus may be used in an operation to re-fill a cash handling apparatus with change in a shop. The cash transport apparatus may be filled with an appropriate amount of notes, e.g. at a cash center or in a cash transport vehicle by a cash transport service provider, and moved to a shop location where such re-filling takes place. Another scenario is one in which a shop keeper has made an agreement with an ATM service provider to interact with an ATM located at the shop, such that cash from a cash handling apparatus is provided to the ATM via a cash transport apparatus or, in the opposite direction of cash flow, from a cash handling apparatus to an ATM. An advantage of such a scenario is that it enables saving of so-called float costs, i.e. savings due to the shortening of the time period during which cash is not in circulation.

A variation of such a scenario is one in which a shop keeper uses a cash transport apparatus as an "over night safe storage" apparatus containing cash from one or more cash handling apparatuses, e.g. in a back-office location. Such a use is advantageous in that it reduces the need for complex and expensive security measures in connection with a cash handling apparatus. By using a transport apparatus, which is inherently more secure than a cash handling apparatus in a shop, secure storage of cash is possible.

In yet another aspect, the present invention is the use of a cash docking station for providing a cash docking service in a cash handling system. Such a use may be in a vehicle as well as at a cash center.

In yet another aspect, the present invention is the use of an ATM for providing an ATM service in a cash handling system. The use of the ATM may be at a shop, for example.

In yet another aspect, the present invention is the use of a cash handling apparatus for providing a cash handling service in a cash handling system. The use of the cash handling apparatus may be at a check-out point in a shop as well as at a back-office location in a shop.

BRIEF DESCRIPTION OF THE DRAWINGS

Below will follow a detailed description of arrangements and methods according to the different aspects of the invention. Reference will be made to the attached drawings on which.

PREFERRED EMBODIMENTS

Figure 1:
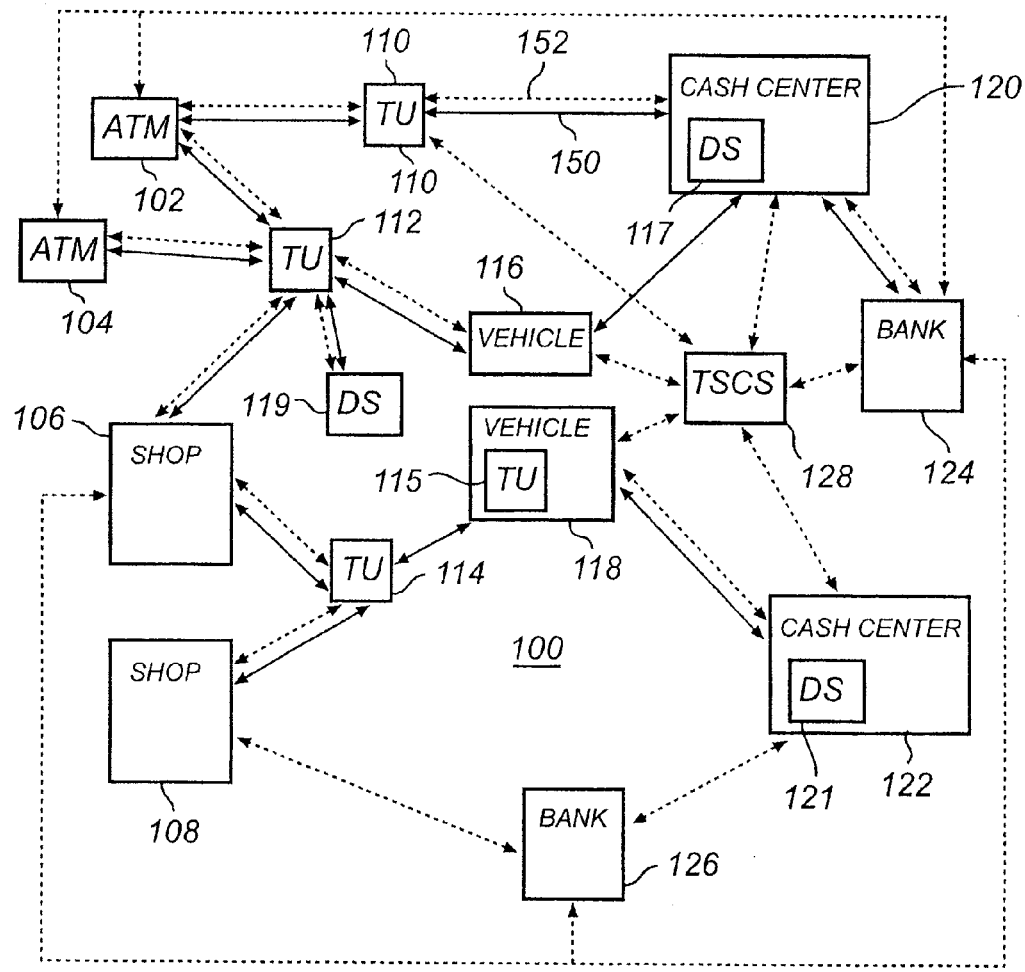
FIG. 1 schematically illustrates a cash handling system and communication paths in such a system, FIG. 2 schematically illustrates, in the form of a block diagram, a cash handling apparatus located in a shop, FIG. 3 schematically illustrates, in the form of a block diagram, a docking station and a cash handling apparatus located in a shop, FIG. 4 schematically illustrates, in the form of a block diagram, an automatic teller machine, FIG. 5 schematically illustrates, in the form of a block diagram, a cash handling arrangement located in a vehicle, FIG. 6 schematically illustrates, in the form of a block diagram, a cash transport apparatus, FIG. 7 schematically illustrates, in the form of a block diagram, another cash transport apparatus, FIG. 8 schematically illustrates, in the form of a block diagram, a cash transport apparatus having a secure and a non-secure section, FIG. 9 schematically illustrates, in the form of a block diagram, a cash handling arrangement located in a cash center, FIG. 10 schematically illustrates, in the form of a block diagram, cash handling arrangements in a financial institute such as a bank, FIG. 11 schematically illustrates, in the form of a block diagram, a cash docking station, FIG. 12 schematically illustrates, in the form of a block diagram, a cash docking station arranged in a wall between a secure and a non-secure area, FIGS. 13a and 13b schematically illustrate, in the form of a signaling diagram and a flow chart, respectively, flow of cash and signals in a cash handling system, FIGS. 14a and 14b schematically illustrate, in the form of a signaling diagram and a flow chart, respectively, flow of cash and signals in a cash handling system, FIGS. 15a and 15b schematically illustrate, in the form of a signaling diagram and a flow chart, respectively, flow of cash and signals in a cash handling system.

Turning now to FIG. 1, a cash handling system 100 in which the present invention is realized will now be described in general terms. More detailed descriptions of the different entities in the system 100 and their interaction will be made below, although it should be noted that throughout this description the level of detail will typically be kept at that of functional descriptions of interacting blocks. It is hence assumed that a person skilled in the art will, by consulting this description and using appropriate engineering skills, be able to implement the functional blocks in the form of properly configured hardware and software arrangements. For example, implementations of the inventive methods are typically in the form of computer programs comprising software instructions and provided via carrier media such as various types of storage disks as well as via propagated signals via wired an wireless communication networks. In FIG. 1, solid line arrows, as exemplified by an arrow having reference numeral 150, represent exchange of cash between entities in the system 100. Dashed line arrows, as exemplified by an arrow having reference numeral 152, represent exchange of information signals between entities in the system 100. The arrows have dual arrow heads, pointing in opposing directions, in order to illustrate that the flow of cash as well as the flow of information signals is in any direction between the entities of the system 100. The flow of information between the different entities may, as the skilled person will realize, be implemented using any appropriate data communication protocol and protection and security may be provided by the use of any authentication, authorization and accounting protocol (AAA-protocol) known in the art. The physical flow of information may entail galvanic connection between communicating entities as well as utilization of wireless connections, as will be exemplified and discussed in more detail below.

The system 100 comprises a plurality of automatic teller machines (ATM) of which a first ATM 102 and a second ATM 104 are illustrated. The ATMs 102, 104 are configured to automatically provide and receive cash during interactions with a human customer (not shown). Further, the system 100 comprises a first retail shop 106 and a second retail shop 108. As the skilled person will realize, the shops 106, 108 may represent any form of shop-like cash handling entity where human interaction takes place between a customer and a teller (not shown) who operates a cash handling apparatus (e.g. a cash handling apparatuses 202, 302 as described below in connection with FIGS. 2 and 3) located in the shop 106, 108. As the skilled person will realize, the teller typically performs transactions in which cash is provided into and withdrawn from the cash handling apparatus. Alternatively, a customer may perform cash transactions in a self-service manner without assistance from a teller.

A number of cash transport units 110, 112 and 114 form parts of the system 100. The transport units are configured, as will be described in more detail below, to store cash in a secure manner and configured to receive cash input and dispense cash during interactions with other entities in the system 100. As indicated by solid line arrows, cash is moved between transport unit 110 and ATM 102, between transport unit 112 and ATMs 102, 104 and shop 106 and between transport unit 114 and shops 106 and 108. Similarly, as indicated by dashed line arrows, information signals are transmitted between transport unit 110 and ATM 102, between transport unit 112 and ATMs 102, 104 and shop 106 and between transport unit 114 and shops 106 and 108. An important property of the transport units is that they each form an individual part of the system 100 and, when properly configured, any transport unit may interact with any other entity in the system. Typically, the transport units 110, 112, 114 are portable boxes having appropriate physical dimensions and weights and mechanical arrangements for enabling simple movement, e.g. handles, such that one person will be capable of moving a transport unit.

Bulk transport of cash in the system 100 is provided by way of vehicles 116 and 118. As indicated by solid line arrows, cash is moved between transport unit 112 and vehicle 116 and cash is moved between transport unit 114 and vehicle 118. It is to be noted that the transport of cash, as indicated by the solid lines discussed above, may entail transporting a cash transport unit within a vehicle 116, 118, as illustrated by a cash transport unit 115 located within vehicle 118. However, the transport may involve any other type of cash container known in the art, e.g. cash bags and cash boxes, into which cash has been provided from the transport units. For example, as will be discussed further below, a transport unit may dock with a docking station 117 that provides cash into bags.

Signaling, i.e. transmission of information signals, is also performed between the vehicle 116 and the transport unit 112. However, as exemplified by vehicle 118 and transport unit 114, signaling may be omitted although cash is moved.

A transport service control center 128 is shown being configured for exchange of information signals with the vehicles 116, 118, cash centers 120, 122 and a bank 124. Signaling between the transport service control center 128 and individual transport units is also possible, as indicated by the signaling connection with transport unit 110. The transport service control center 128 is typically an entity representing a provider of transport services, including vehicles and vehicle staff, to other entities in the system such as shops, banks, ATM operators etc. No cash is being conveyed via the transport service control center 128. The information signals that are exchanged with other entities of the system include such information as instructions regarding collection of cash from a shop or an ATM, status information such as geographical location and any security status information and supervisory information needed in order to provide a secure transport service.

The system further comprises a number of cash centers 120 and 122. The cash centers 120, 122 perform the function of being depositories for cash and receive and provide cash to vehicles 116 and 118, respectively. Moreover, as illustrated by the solid arrow 150 between cash center 120 and transport unit 110, cash may be provided directly from a transport unit, i.e. transport unit 110, to a cash center and vice versa without the utilization of a vehicle. Cash centers may be located at specific cash center locations, typically in the form of a specifically configured, relatively large, building complex located remote from other buildings and into which vehicles carrying cash are moved. However, a physically relatively small cash center may also be located in close vicinity to one or more shops, such as in a shopping mall.

A first cash docking station 117 is illustrated within the cash center 120. Operation of the cash docking station 117 typically involves at least one transport unit out of which, or into which, cash is provided. For example, a docking station is configured to mate with a cash transport unit and to cooperate such that cash is conveyed from the transport unit into the docking station, where the cash may be processed, and out of the docking station. The output of cash from the docking station may be as simple as feeding cash onto a table surface but also more elaborate such as feeding cash into a cash container. Such a cash container, although not illustrated in FIG. 1, may be a cash bag, another cash transport unit, a typical ATM cash cassette or any other suitable container configured to mate with the docking station.

Although the docking station 117 in FIG. 1 is illustrated to be located within the cash center 120, other locations for docking stations are also possible. For example, as will be discussed in further detail below, a docking station may be located within, or in the vicinity of, a shop and also in a vehicle or a bank etc. as illustrated by a second docking station 119.

Two financial institutes in the form of banks 122 and 124 are also comprised in the system 100. As indicated by the solid line arrow between bank 124 and cash center 120, cash may be transported to and from the bank. However, as exemplified by bank 126, it is not necessary that the bank 126 receives or provides cash within the framework of the system 100 as discussed here. As illustrated by dashed arrows, information signals are transmitted between the banks 124, 126, the cash centers 120, 122 as well as between the banks 124, 126 and the ATMs 102, 104 and the shops 106, 108.

As the skilled person will realize, the transport of cash between the different entities in the system 100 typically pertain to issues regarding ownership and changes of ownership of the cash that is transported in the system 100. These ownership issues are not illustrated in FIG. 1, but will be discussed below in connection with FIGS. 13 to 15.

Figures 6, 7:
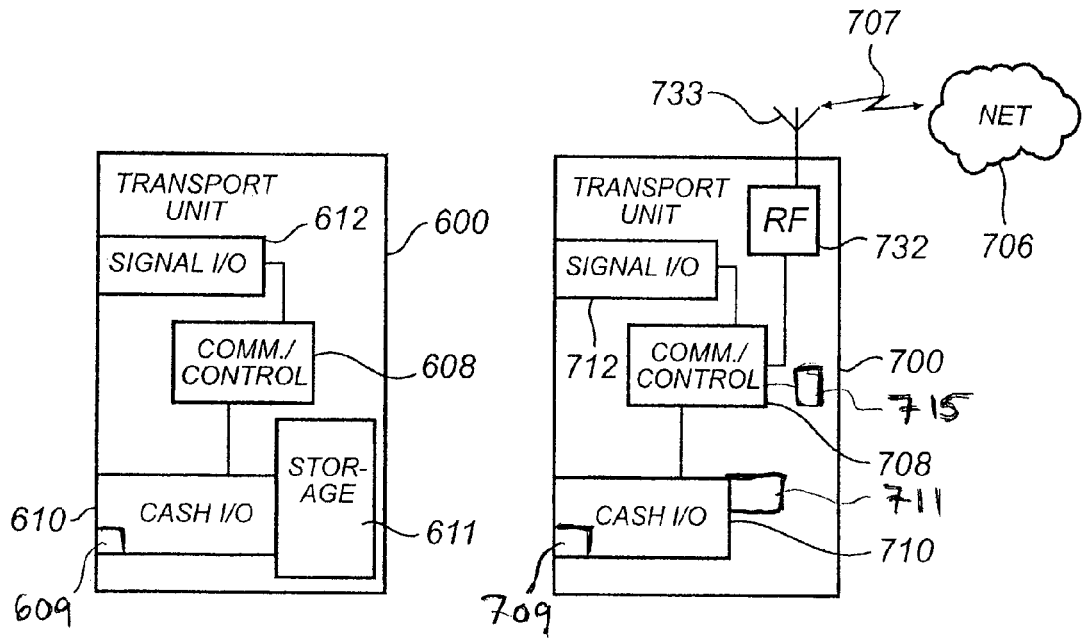
Figure 8:
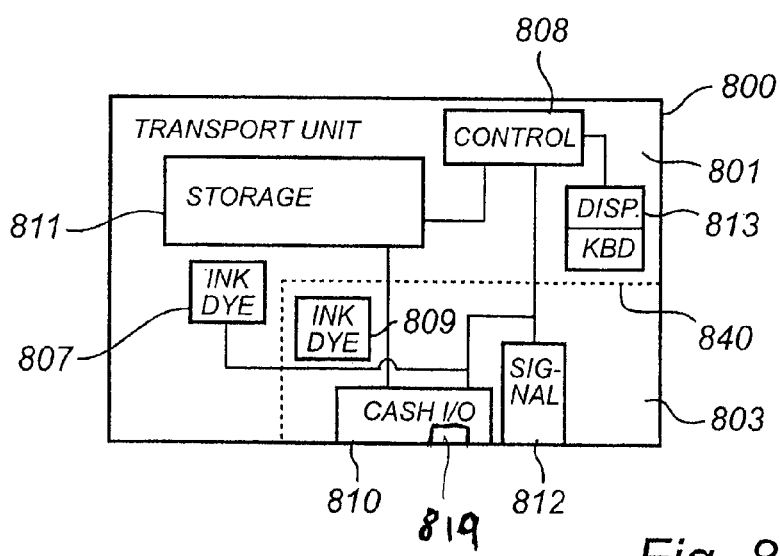
Figures 9, 10:
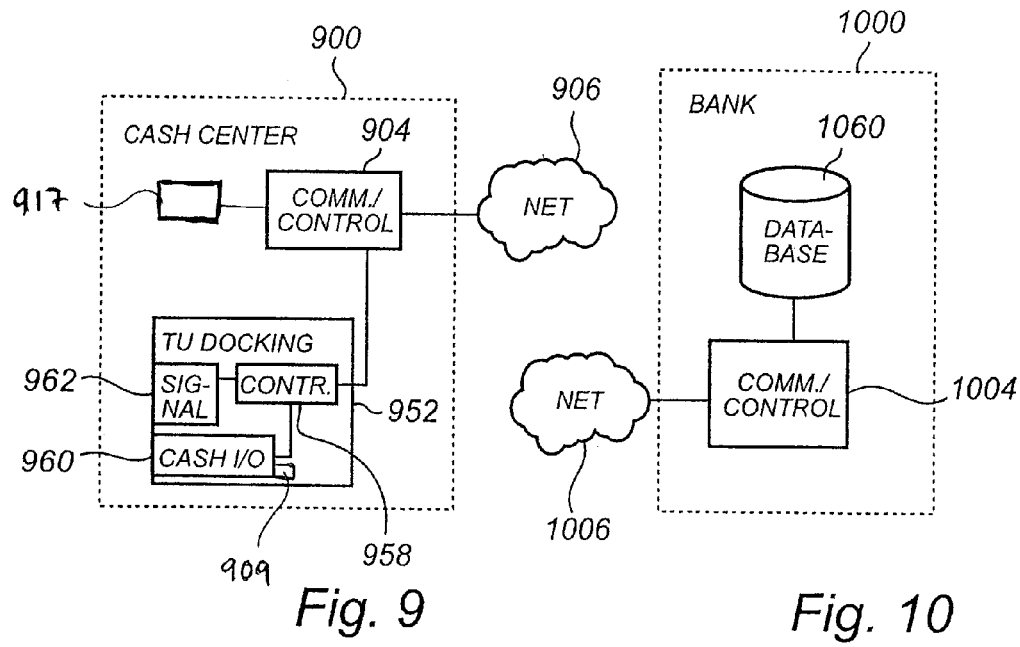
Figure 11:
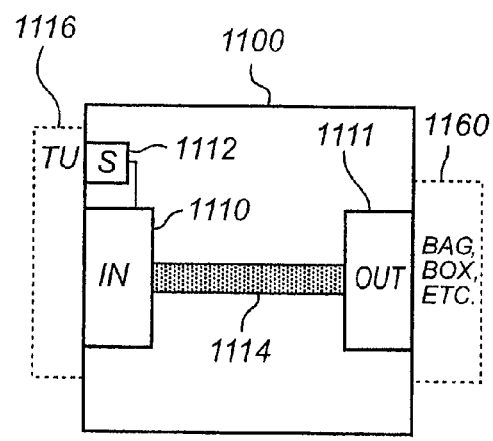
Figure 12:
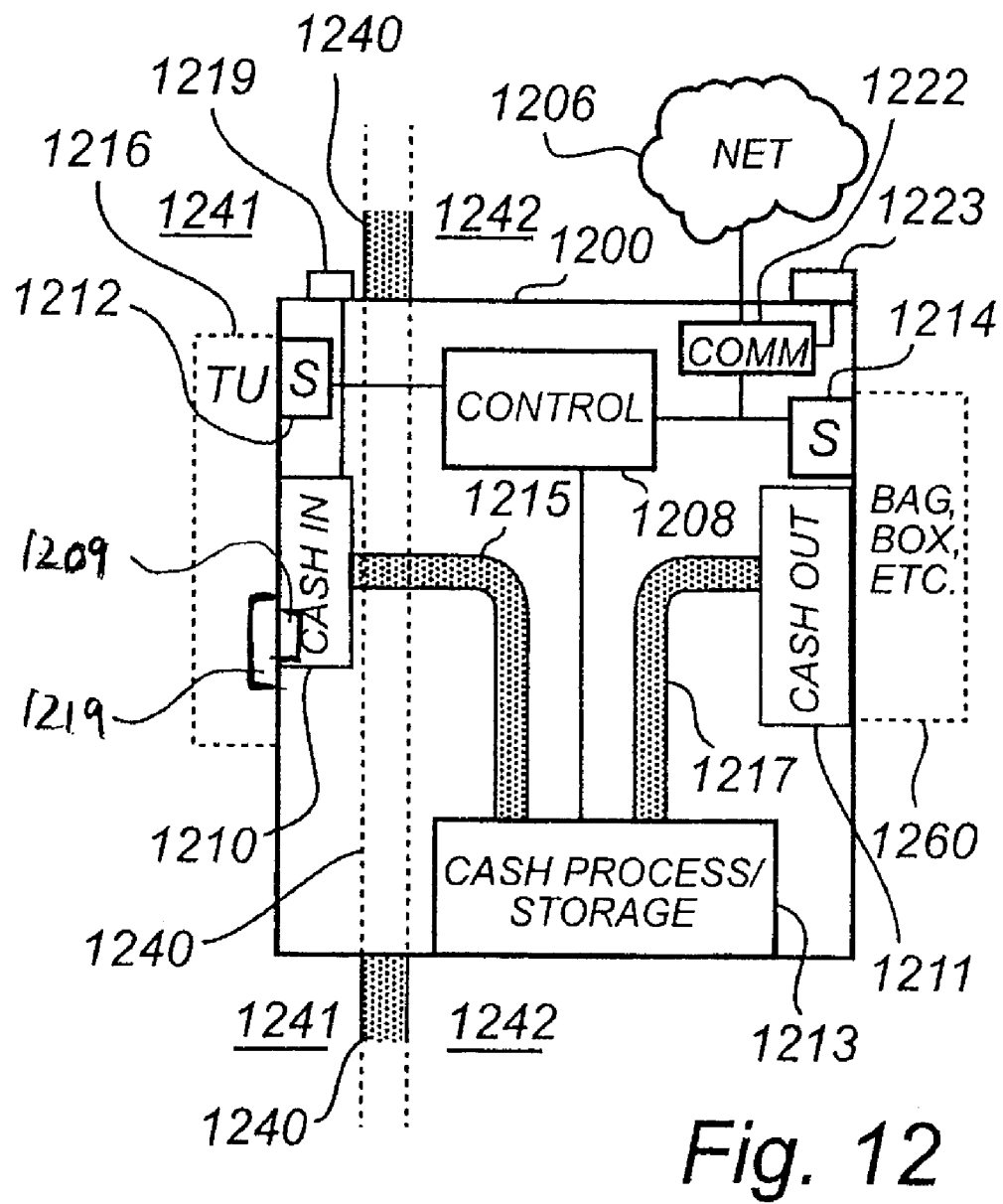

Turning now to FIGS. 2 to 12, different entities in a system 100 as described above with reference to FIG. 1 will be described in more detail. FIGS. 2 and 3 illustrate a respective shop 200, 300 in which cash handling apparatuses are located, for example corresponding to shop 106 and shop 108, respectively, in FIG. 1. FIG. 4 illustrates an ATM 400, e.g. any of the ATMs 102 and 104 in FIG. 1. FIG. 5 illustrates a vehicle 500, e.g. any of the vehicles 116 and 118 in FIG. 1. FIGS. 6, 7 and 8 illustrate a respective cash transport unit 600, 700 and 800, e.g. corresponding to any of the transport units 110, 112 and 114 in FIG. 1. FIG. 9 illustrates a cash center 900, e.g. any of the cash centers 120 and 122 in FIG. 1. FIG. 10 illustrates a bank 1000, e.g. any of the banks 124 and 126 in FIG. 1. FIGS. 11 and 12 illustrate cash docking stations, e.g. the docking station 117 in FIG. 1.

It is to be noted that the descriptions of the arrangements in FIGS. 2 to 12 are focused on the main functional units comprised in each respective arrangement and very little discussion will be spent on the mechanical and electrical realizations of the arrangements. For example, although necessary for the operation of each arrangement, power supply circuitry are assumed to be present and appropriately configured as is already known in the art.

Hence, the shop 200 illustrated in FIG. 2 comprises a cash handling apparatus 202 that is configured to be operated by a human teller during cash transactions involving a customer and/or operated by a customer during self service transactions without assistance from a teller. Typically, the cash handling apparatus 202 is located at a check-out location in the shop 200 and is operated when a customer is paying for merchandise or services provided by the shop 200. The cash apparatus 202 comprises a cash input/output unit 210 that is configured to receive and dispense cash in the form of bank notes from the teller. The cash input/output unit 210 is also configured such that it is capable of being mechanically connected with a cash transport unit, e.g. any of the transport units 600, 700, 800 to be described below, and thereby configured to convey cash to and from the transport unit. The cash input/output unit 210 is also configured such that it stores cash, for example in such a way that it is capable of operating in a cash recycling manner. Moreover, although not shown in detail, the cash input/output unit 210 may also be configured with a detector 211 capable of sensing a number of characteristics regarding notes fed into the input/output unit 210. For example, input/output unit 210 is capable of sensing, under control of a control and communication unit 208, notes not desirable for dispensing, potentially counterfeit notes, unfit notes, foreign currency notes, small denomination notes and large denomination notes.

Any suitable detector may be utilized in the apparatus of the present invention. In some embodiments, the detector 211 is a magnetic sensor (e.g., including but not limited to, magnetic sensors similar to those described in U.S. Pat. Nos. 5,960,103 and 6,047,886; each of which is herein incorporated by reference). The detector 211 may also be similar to the bill testing arrangement described in U.S. Pat. Nos. 5,975,273 and 5,533,627 (herein incorporated by reference) that are utilized to determine the authenticity and value of deposited notes. The detector 211 may also be similar to the sensor unit described in U.S. Pat. No. 6,074,081 (herein incorporated by reference). The detector 211 may also be similar to the illumination device and sensor described in U.S. Pat. No. 6,061,121 (herein incorporated by reference). The detector 211 may also be similar to the detector described in U.S. Pat. Nos. 6,101,266 and 5,923,413 (herein incorporated by reference) or the document sensor described in U.S. Pat. No. 6,241,244 (herein incorporated by reference).

The storage functionality of the input/output unit 210 may be configured such that it is capable of storing, e.g. in separated compartments, any of these types of notes sensed by the input/output unit 210.

The control and communication unit 208 is connected to, and configured to control, the cash input/output unit 210 as well as a signaling interface unit 212. Mechanical engagement and disengagement between the input/output unit 210 and a transport unit (to be described in further detail below) may hence be controlled, via engagers 209 in the input/output 210, by the control and communication unit 208 that, preferably, cooperates with a corresponding controller in a transport unit.

Needless to say, the control and communication unit 208 may comprise any suitable programmable circuitry and memory, as the skilled person will realize when implementing the cash handling apparatus 202. The control and communication unit 208 is hence provided with one or more computer programs comprising software instructions that, when executed, provide signals to the various functional units within the cash handling apparatus 202 as well as communication signals with other entities in a cash handling system.

The signaling interface unit 212 is configured to be connected with a corresponding signaling interface unit in a cash transport unit, e.g. any of the transport units 600, 700, 800 to be described below, and thereby configured to convey signaling information and data to and from the transport unit. As will be discussed in more detail below, signaling between a cash handling apparatus and a transport unit will entail exchanging information relating to cash transactions such as time stamps, amounts of cash input or cash output etc. as well as information relating to cash transport procedures during interaction with a cash transport unit such as time stamps, identification and authorization information etc. as well as cash amounts.

The cash handling apparatus 202 is connected, via the control and communication unit 208, to a shop communication and control system 204, including such shop communication and control systems that provide self check-out services. Typically, a number of cash handling apparatuses similar to the cash handling apparatus 202 will be connected to the shop communication and control system 204. Connection with other shops, cash centers, banks etc. is provided via a network 206. As the skilled person will realize, the network 206 may be any of a local area network (LAN), a wide area network (WAN) such as the Internet or any other suitably configured network including both wired and wireless networks. As will be discussed in more detail below, communication over the network 206 will entail transmission of signaling information and data between the cash handling apparatus 202 and cash centers and banks, relating to cash transactions as well as cash transport operations. A printer 217 may also be connected to the shop communication and control system 204.

The shop 300 in FIG. 3 is similar to the shop 200 described above and hence a cash handling apparatus 302 that is configured to be operated by a human teller and/or operated by a customer during self service transactions. The cash handling apparatus 302 comprises similar elements as the apparatus 202 described in detail above with reference to FIG. 2 and, hence, it is connected, via a control and communication unit 308, to a shop communication and control system 304, including such shop communication and control systems that provide self check-out services. Typically, a number of cash handling apparatuses similar to the cash handling apparatus 302 will be connected to the shop communication and control system 304. Connection with other shops, cash centers, banks etc. is provided via a network 306 in a similar fashion as described in connection with FIG. 2.

A cash docking station 352 is also connected to the shop communication and control system 304 and, as indicated by a dashed line 340, the docking station 352 is located "back office", typically forming a relatively secure section 340 of the shop 300. The secure section 340 of the shop 300 typically comprises a vault or similarly configured arrangement 349 for containing cash provided from the docking station 352.

The cash docking station 352 is configured to interact with a cash transport apparatus at least in such a manner that it receives cash from a transport unit, e.g. any of the transport units 600, 700, 800 to be described below, and provides output of cash into any type of cash container, such as bags and boxes. However, output of cash may also be provided in the most simple manner by simply dumping cash through a chute or similar mechanical arrangement.

Hence, similar to the cash handling apparatus 202 described above in connection with FIG. 2, the cash docking station 352 comprises a cash input/output unit 360 that is configured to receive input of cash from a transport unit and provide output of cash into, e.g. bags and boxes. The cash input/output unit 360 is also configured such that it is capable of storing cash that has been input, until a later time when output is desired, for example at a time immediately prior to removing the cash from the shop 300 into a cash transport vehicle.

Further, a control and communication unit 358 is connected to, and configured to control, the cash input/output unit 360 as well as a signaling interface unit 362. Mechanical engagement and disengagement between the input/output unit 360 and a transport unit may hence be controlled, via engagers 309 in the input/output 360, by the control and communication unit 358 that, preferably, cooperates with a corresponding controller in a transport unit.

The control and communication unit 358 may comprise any suitable programmable circuitry and memory, as the skilled person will realize when implementing the cash docking station 352. The control and communication unit 358 is hence provided with one or more computer programs comprising software instructions that, when executed, provide signals to the various functional units within the docking station 352 as well as communication signals with other entities in a cash handling system.

The signaling interface unit 362 is configured to be connected with a corresponding signaling interface unit in a cash transport unit, e.g. any of the transport units 600, 700, 800 to be described below, and thereby configured to convey signaling information and data to and from the transport unit. As will be discussed in more detail below, signaling between a cash docking station and a transport unit will entail exchanging information relating to cash transactions such as time stamps, amounts of cash input or cash output etc. as well as information relating to cash transport procedures during interaction with a cash transport unit such as time stamps, identification and authorization information etc. as well as cash amounts.

The ATM 400 illustrated in FIG. 4 is configured to be operated by a customer during cash transactions. The ATM 400 comprises a cash input/output unit 410 that is configured to dispense cash in the form of bank notes to a customer. The ATM is also configured to receive input of cash from a customer when performing a deposit transaction, for example to credit a bank account. The cash input/output unit 410 is also configured such that it is capable of being mechanically connected with a cash transport unit, e.g. any of the transport units 600, 700, 800 to be described below, and thereby configured to convey cash to and from the transport unit. Mechanical engagement and disengagement between the input/output unit 410 and a transport unit is controlled, via engagers 409 in the input/output 410, by a control and communication unit 408 that, preferably, cooperates with a corresponding controller in the transport unit (e.g. 608 in FIG. 6, 708 in FIG. 7 and 808 in FIG. 8). Moreover, although not shown in detail, the cash input/output unit 410 is also configured with a detector 411 capable of sensing a number of characteristics regarding individual notes fed into the input/output unit 410. For example, input/output unit 410 is capable of sensing, under control of the control and communication unit 408, notes not desirable for dispensing, potentially counterfeit notes, unfit notes, foreign currency notes, small denomination notes and large denomination notes.

Connected to the cash input/output unit 410 and also operated under the control of the control and communication unit 408 is a note storage unit 414. The storage unit 414 is configured to store notes in separate storage areas typically in the form of cassettes, here exemplified by reference numerals 415 and 417, such that each storage area may be designated to store one type of notes as sensed by the input/output unit 410. The control and communication unit 408 may also be configured to control the storage unit 414 to retain any type of notes that are not suitable for circulation, such as potentially counterfeit notes.

An optional storage access arrangement 416 is configured, by way of any known mechanical or electromechanical barrier mechanism such as a lock, to allow access to the storage areas in the storage unit 414 without the use of a cash transport unit as discussed above. The input/output unit 410 and the storage unit 414 are further configured such that they are capable of being controlled by the control and communication unit 408 to operate in a cash recycling manner. That is, notes that have been input to the storage unit 414 during a first user transaction involving a deposit may be re-used in a later transaction involving any other user to whom notes are dispensed from the storage unit 414.

The control and communication unit 408 is further connected to, and configured to control, a signaling interface unit 412 and a user interface unit 413 that comprises a display, a keypad and a card reader, the hardware of which will not be discussed in detail as this would clutter the description with details already known in the art.

Furthermore, the control and communication unit 408 is also connected to, and configured to control, a printer 419, an ink dye protection system 420 and a camera 418. The ink dye protection system 420 is located adjacent to the storage unit 414 and it includes sensing units for sensing unauthorized access attempts to the storage unit 414 and ink ejectors for ejecting ink onto notes in the storage unit 414. As the skilled person will realize, the ink dye protection system 420 may be replaced by any destructive protection system known in the art.

The camera 418 is controlled to record images of any customer that operates the ATM 400. Depending on configuration, the camera control may involve transmission of such images via a network 406 to a supervisor of the ATM 400 for the purpose of providing the possibility of an independent identification of a customer trying, e.g., to operate the ATM in an unauthorized manner.

The control and communication unit 408 may comprise any suitable programmable circuitry and memory, as the skilled person will realize when implementing the ATM 400. The control and communication unit 408 is hence provided with one or more computer programs comprising software instructions that, when executed, provide signals to the various functional units within the ATM 400 as well as communication signals with other entities in a cash handling system.

The signaling interface unit 412 is configured to be connected with a corresponding signaling interface unit in a cash transport unit, e.g. any of the transport units 600, 700, 800 to be described below, and thereby configured to convey signaling information and data to and from the transport unit. As will be discussed in more detail below, signaling between an ATM and a transport unit will entail exchanging information relating to cash transactions such as time stamps, amounts of cash input or cash output etc. as well as information relating to cash transport procedures during interaction with a cash transport unit such as time stamps, identification and authorization information etc. as well as cash amounts.

As briefly mentioned already, the ATM 400 is connected, via the control and communication unit 408, to a network 406. As the skilled person will realize, the network 206 may be any suitably configured ATM network including both wired and wireless networks. As will be discussed in more detail below, communication over the network 406 will entail transmission of signaling information and data between the ATM 400 and cash centers and banks, relating to cash transactions as well as cash transport operations.

The vehicle 500 illustrated in FIG. 5 comprises a transport unit rack 530 that is configured to hold cash transport units 531, e.g. any of the transport units 600, 700, 800 to be described below. The rack 530 is configured in such a manner that mechanical connection between the rack 530 and the transport units 531 is secured and that electric signaling is made possible between the transport units 531 and other entities in a cash handling system such as the system 100 of FIG. 1. The signaling is realized via a control and communication unit 508, a radio frequency transceiver unit 532, an antenna 533, a radio interface 507 and a network 506. Needless to say, the network 506 includes functionality similar to the networks described elsewhere in the present specification, as well as necessary radio interface networking functions, as the skilled person will realize.

As will be discussed in more detail below, signaling between the vehicle 500, or rather the rack 530 of transport units within the vehicle 500, and other entities will entail exchanging information such as time stamps, amounts of cash as well as information relating to the actual cash transport procedures such as geographical information, security status of the transport units etc.

The control and communication unit 508 may comprise any suitable programmable circuitry and memory, as the skilled person will realize when implementing the vehicle 500. The control and communication unit 508 is hence provided with one or more computer programs comprising software instructions that, when executed, provide signals to the various functional units within the vehicle 500 as well as communication signals with other entities in a cash handling system.

Although transport units 531 are conveyed by the vehicle 500, it is not necessary that any information contained in a transport unit is accessible to the vehicle, i.e. the transport unit rack in the vehicle, or to any vehicle staff. Such a configuration may be obtained by appropriate mechanical and/or electric configuration of the rack 530 and/or the transport units 531 themselves.

The cash transport unit 600 illustrated in FIG. 6 comprises a cash input/output unit 610 that is configured such that it is capable of being mechanically connected with a cash handling apparatus and a docking station, e.g. any of the arrangements 202, 302 and 352 described above, and thereby configured to convey cash to and from the transport unit 600. The cash input/output unit 610 is configured such that it conveys cash to a cash storage unit 611 connected to the cash input/output unit 610. Mechanical engagement and disengagement between the input/output unit 610 and other entities is controlled, via an engager 609. The cash storage unit 611 is arranged within the transport unit 600 such that it is secure from tampering and thereby stops unauthorized access to stored cash. This separation of the transport unit 600 into two sections, a secure section containing the storage unit 611 and a non-secure section containing the other units, will be discussed further below in connection with another embodiment of a transport unit.

A control and communication unit 608 is connected to, and configured to control, the cash input/output unit 610 during mechanical engaging and disengaging with other entities and during conveying of cash. The control and communication unit 608 is also connected to, and configured to control, a signaling interface unit 612. The control and communication unit 608 may comprise any suitable programmable circuitry and memory, as the skilled person will realize when implementing the transport unit 600. The control and communication unit 608 is hence provided with one or more computer programs comprising software instructions that, when executed, provide signals to the various functional units within the transport unit 600 as well as communication signals with other entities in a cash handling system.

The signaling interface unit 612 is configured to be connected with a corresponding signaling interface unit in a cash handling apparatus, e.g. any of cash handling apparatuses 202, 302 and docking station 352 described above, and thereby configured to convey signaling information and data to and from these apparatuses. As will be discussed in more detail below, signaling will entail exchanging information relating to cash transactions such as time stamps, amounts of cash input or cash output etc. as well as information relating to cash transport procedures during interaction with a cash handling apparatus and docking station such as time stamps, identification and authorization information etc. as well as cash amounts.

The transport unit 700 in FIG. 7 is similar to the transport unit 600 described above and hence comprises a cash input/output unit 710 comprising a cash storage unit 711, a control and communication unit 708 and a signaling interface unit 712. Mechanical engagement and disengagement between the input/output unit 710 and other entities is controlled, via an engager 709. Control of the different units in the transport unit 700 is hence performed in a similar manner as already described. For example, the control and communication unit 708 is provided with one or more computer programs comprising software instructions that, when executed, provide signals to the various functional units within the transport unit 700 as well as communication signals with other entities in a cash handling system.

In addition to these components, the transport unit 700 also comprises a radio frequency transceiver unit 732, an antenna 733, a radio interface 707 for communication with other entities, such as cash centers, vehicles, transport service control centers etc. as will be exemplified below, via a network 706. Needless to say, the network 706 includes functionality similar to the networks described elsewhere in the present specification, as well as necessary radio interface networking functions, as the skilled person will realize.

Signaling between the transport unit 700 and other entities will entail exchanging information such as time stamps, amounts of cash as well as information relating to the actual cash transport procedures such as geographical information, security status of the transport unit etc. For example, by incorporating a positioning unit 715 such as a Global Positioning System, GPS, receiver in the transport unit 700 and connected to the control and communication unit 708 and possibly also to the signaling interface unit 712, information regarding the exact geographical position of the transport unit 700 may be communicated to other entities with which the transport unit 700 communicates. Simpler geographical tracking may be obtained by configuring a Radio Frequency Identification (RFID) tag into the transport unit 700 and incorporating the transport unit 700 in a RFID system.

The transport unit 800 in FIG. 8 is similar to the transport units 600, 700 described above and hence comprises a cash input/output unit 810, a cash storage unit 811, a control and communication unit 808 and a signaling interface unit 812. Mechanical engagement and disengagement between the input/output unit 810 and other entities is controlled, via an engager 819. Control of the different units in the transport unit 800 is hence performed in a similar manner as already described. For example, the control and communication unit 808 is provided with one or more computer programs comprising software instructions that, when executed, provide signals to the various functional units within the transport unit 800 as well as communication signals with other entities in a cash handling system.

The transport unit 800 is divided into a secure part 801 and a non-secure part 803 as indicated by a dashed line 840. The secure part 801 is configured such that unauthorized access to the storage unit 811 is prevented. Furthermore, the transport unit 800 also comprises a user interface unit 813 in the form of a display and keypad, for example in the form of a touch sensitive display unit where information regarding the transport unit 800 is displayed and via which an operator, i.e. a person carrying the transport unit 800, may enter information for processing in the control and communication unit 808. Displayed information may include a destination address and other status and operational information.

Ink dye protection is provided by way of a first ink dye system 807 configured within the secure part 801 of the transport unit 800 and a second ink dye system 809 configured within the non-secure part 801 of the transport unit 800. Both ink dye systems 807 and 809 are connected to the control and communication unit 808 and comprise sensors for sensing unauthorized access to any of the secure and non-secure parts of the transport unit 800, for communicating signals to the control and communication unit 808 and for activating ink dyeing of cash. Alternatively, any of the ink dye systems 807, 809 may operate independently without connection to the control and communication unit 808.

Any of the transport units 600, 700, 800 described above may be configured such that it operates as a cash deposit apparatus, e.g. located at a teller in a shop. Such a configuration may simply entail mechanical mounting arrangements that allow easy access for a teller when feeding notes into the transport unit, while at the same time allowing for removal when ready to be moved by, e.g., a cash transport service. Preferably, a transport unit configured as a deposit apparatus is configured with a user interface that facilitate the use of the transport apparatus when notes are deposited (typically performed manually by a teller). Moreover, such a transport apparatus configuration may comprise a note validator, i.e. arrangements in the input/output unit capable of validate whether or not a note is acceptable or potentially counterfeit. Such a cash deposit apparatus may or may not be connected to a shop control and communication system. Although a transport unit configured as a deposit apparatus is mainly intended for deposit operations, it may also be configured to provide output of notes.

Moreover, any of the transport units 600, 700, 800 described above may be configured with access control configured such that it is necessary for an operator, i.e. a person who is to operate it to connect to an entity in the cash handling system, to authorize by using an access controller to activate circuitry in the transport unit. Such access controller may be of any suitable type, including biometric sensors and more simple password/PIN access controllers.

Furthermore, although the transport units 600, 700, 800 described above are typically configured to operate in connection with other types of entities in a cash handling system, it is also feasible that two transport units interact directly with each other (including transport units of any other type than those described herein), exchanging information as well as cash, with or without any interface.

A cash transport unit (e.g., 600, 700, 800), such as those described above, and each cash handling entity (e.g., cash apparatus 202, cash docking station 352, and ATM 400) of the system are preferably provided with engagers (e.g., 209, 309, 409, 609, 709, 819) that may be in the form of complementary mechanical formations that co-operate with one another to retain the cash transport unit and a cash handling entity in pre-determined relative positions during flow of cash there between.

In one embodiment, the mechanical formations of the engagers (e.g., 209, 309, 409, 609, 709, 819) preferably comprise a releasable locking mechanism acting between the cash transport unit (e.g., 600, 700, 800) and a cash handling entity (e.g., cash apparatus 202, cash docking station 352, and ATM 400) for retaining the cash transport unit fast with the cash handling entity until a decision has been made to release the transport unit from the cash handling entity.

The reasons for locking together the transport unit (e.g., 600, 700, 800) and the cash handling entity e.g., cash apparatus 202, cash docking station 352, and ATM 400) may be:
a) security against interference with the transport unit or theft thereof, and
b) safety, to prevent the transport unit tilting or falling with the danger of injury to an operative or member of the public.

The releasable locking mechanism of the engagers (e.g., 209, 309, 409, 609, 709, 819) is preferably electro-mechanically actuated.

When the cash handling entity is an ATM (e.g., 400 in FIG. 4), and the cash transport unit (e.g., 800 in FIG. 8) is to be hand-carried, the complementary mechanical formations of the engagers (e.g., 409 in FIG. 4 and 819 in FIG. 8) are preferably configured to support the weight of the cash transport unit when the unit is connected to the ATM.

Preferably the complementary mechanical formations of the engagers 409, 809 then comprise at least one upwardly directed lug on the face of the ATM 400 and at least one downwardly directed hook on the opposing face of the transport unit so arranged as to permit the transport unit to be offered to the ATM and hooked onto the ATM, to assist in supporting the weight of the transport unit.

Preferably the upwardly directed lug is constituted by an upwardly directed flange that extends adjacent to the upper margin of the front face of the ATM 400, and the hook is constituted by a downwardly directed flange depending from the housing of the transport unit 800.

This provides a concealed connection between the two units.

In one embodiment, the releasable locking mechanism preferably comprises one or more spring-loaded detents, which preferably project from the housing of the transport unit 800 and co-operate with respective detent recesses provided in the lower part of the front face of the ATM 400.

The spring-loaded detents preferably each comprise a rounded detent head which may be in the form of a part-spherical head. This can provide a camming/snap-fit on pressing of the transport unit towards the ATM 400, after engagement of the hooks.

The ATM 400 and transport unit 800 are preferably provided with complementary downwardly-divergent guide formations so configured as to guide the transport unit towards said predetermined assembled position when the hooks are engaged over said ATM lugs and the transport unit is urged/ moves downwards to fully engage the hooks and lugs.

Thus the guide formations guide the transport unit 800 in the lateral direction as viewed facing the ATM 400, as the transport unit moves downwards on the ATM.

The guide formations on the ATM 400 are conveniently provided by protruding portions of the vertical side frame members of the ATM.

An electro-magnetically operated detent locking arrangement is preferably provided to lock the detent in the projected, locking position, the detent locking arrangement comprising, for example, a solenoid-operated pin extending through a bore in the detent when the detent is in a fully-projected position.

Each detent locking arrangement may be used to provide a respective electrical connection between a respective circuit element of the ATM 400 and a respective circuit element of the transport unit 800.

Each detent recess may be provided in a respective pad that is insulated from the surrounding material in which the pad is seated.

Since the detent recesses need not be very deep, they are easily cleanable in use, and should not attract attention by vandals.

Preferably the circuit elements associated with the detent form part of a signalling circuit for providing signalling between the ATM 400 and the transport unit 800.

When the transport unit 800 is required to receive power from the ATM 400, power connections between the ATM and the transport unit preferably comprise spring-loaded connector pins that engage with respective connector pads, the connector pins preferably being carried by the transport unit, and the connector pads by the ATM housing. (These may be of similar construction to those used on a car's fifth door/hatchback.)

In other words, mechanical engagement between a transport unit (e.g., 600, 700, 800), and another entity (e.g., cash apparatus 202, cash docking station 352, and ATM 400) in the cash handling system may be established in an active manner, by controlling engagers (e.g., 209, 309, 409, 609, 709, 819), or in a more passive manner as described above.

Although an ATM 400 has been used above to exemplify mechanical engagement, any other entity in a cash handling system may be configured with equal or similar arrangements for providing equal or similar functionality.

The cash center 900 illustrated in FIG. 9 performs the function of being depositories for cash and receive and provide cash from and to transport units. A cash docking station 952 is connected to a communication and control system 904 and is configured to interact with a cash transport apparatus at least in such a manner that it receives cash from a transport unit, e.g. any of the transport units 600, 700, 800 described above, and provides output of cash into any type of cash container, such as bags and boxes including any type of transport unit such as the transport units 600, 700, 800 described above. However, output of cash may also be provided in the most simple manner by simply dumping cash through a chute or similar mechanical arrangement. A printer 917 may be connected to the communication and control system 904.

Hence, similar to the cash docking station 352 described above in connection with FIG. 3, the cash docking station 952 comprises a cash input/output unit 960 that is configured to receive input of cash from a transport unit and provide output of cash into, e.g. bags and boxes. The cash input/output unit 960 is also configured such that it is capable of storing cash that has been input, until a later time when output is desired, for example at a time immediately prior to removing the cash from the cash center 900.

Further, a control and communication unit 958 is connected to, and configured to control, the cash input/output unit 960 as well as a signaling interface unit 962. Mechanical engagement and disengagement between the input/output unit 960 and a transport unit 600 (FIG. 6), 700 (FIG. 7) may hence be controlled, via engagers 909 in the input/output unit 960, by the control and communication unit 958 that, preferably, cooperates with a corresponding controller in a transport unit. However, mechanical engagement may also be established in a more passive manner without control by the control and communication unit 958, as described above.

The control and communication unit 958 may comprise any suitable programmable circuitry and memory, as the skilled person will realize when implementing the cash docking station 352.

The signaling interface unit 962 is configured to be connected with a corresponding signaling interface unit in a cash transport unit, e.g. any of the transport units 600, 700, 800 described above, and thereby configured to convey signaling information and data to and from the transport unit. As will be discussed in more detail below, signaling between a cash docking station and a transport unit will entail exchanging information relating to cash transactions such as time stamps, amounts of cash input or cash output etc. as well as information relating to cash transport procedures during interaction with a cash transport unit such as time stamps, identification and authorization information etc. as well as cash amounts.

The cash center 900 is connected, via the control and communication unit 904, to a network 906. As the skilled person will realize, the network 906 may be any suitably configured communication network including both wired and wireless networks. As will be discussed in more detail below, communication over the network 906 will entail transmission of signaling information and data between the cash center 900, other cash centers and banks, as well as shops, ATMs, vehicles and transport units, relating to cash transactions as well as cash transport operations.

The bank 1000 illustrated in FIG. 10 performs functions such as keeping records associated with bank accounts belonging to customers such as shops and individual customers, as the skilled person will realize. The functionality needed to perform such bank functions include a database 1060 and a communication and control system 1004. Information relating to transactions with other entities in a cash handling system, such as the system 100 discussed above, are conveyed via the communication and control system 1004 and a network 1006.

Turning now to FIG. 11, a cash docking station 1100 having a very simple configuration will be described. A cash input unit 1110 and a signal connector 1112 are configured to mate with a cash transport unit 1116, such as any of the transport units discussed above. The cash input unit 1110 is connected, via a cash flow path 1114, to a cash output unit 1111 to which a cash receiving arrangement 1160 is optionally attachable. The cash receiving arrangement 1160 may be any container configured to receive and hold cash, such as a bag, box, ATM cash box etc.

The signal connector 1112 is connected too the cash input unit 1110 in such a manner that it provides an indication of an established mating between a transport unit and the docking station 1100. This connection and indication may be in a form of a purely mechanical interface, not involving electrical signaling, the operation of which triggers the docking station to receive cash from the mated transport unit 1116 and to convey the cash via the cash flow path 1114 and the output unit 1111, outputting the cash to an operator directly or indirectly into a bag, box etc. as indicated by the receiving arrangement 1160. The signal connector 1112 and it's effect on the cash input unit 1110 may also be configured such that electric signaling is involved, as exemplified above in connection with FIGS. 3 and 9.

Although not shown in FIG. 11, the docking station 1100 may be configured in a manner that is "reverse" to that in FIG. 11. That is, the cash input unit 1110 and the cash output unit 1111 may be interchanged to allow input of cash from any suitable type of cash providing apparatus, including simple manual feeding of cash by hand as well as any cash transport unit such as a stacker box, a cash bag etc. Output of cash in such a "reverse" docking station may be to a transport box, such as any transport box described above.

Turning now to FIG. 12, a more elaborated cash docking station 1200 will be described. Similar to the docking apparatus 1100 described above, the cash docking station 1200 comprises a cash input unit 1210 configured to mate with a cash transport unit 1216, such as any of the transport units discussed above, via respective engagers 1209, 1219. The cash input unit 1210 is connected, via a first cash flow path 1215, a cash storage and processing unit 1213 and a second cash flow path 1217, to a cash output unit 1211 to which a cash receiving arrangement 1260 is optionally attachable. The cash receiving arrangement 1260 may be any container configured to receive and hold cash, such as a bag, box, ATM cash box etc., but also more simple configurations are possible such as simple stacking of notes.

A docking station controller 1208 is configured to receive and process signals from an input unit signal connector 1212 and an output unit signal connector 1214, as well as other input units such as a printer, keypad or touch sensitive display 1223 and from external signal sources from entities of a communication network 1206 via a communication interface 1222. Examples of entities connected to the network include cash centers (including a cash center at which the docking station 1200 is arranged) as well as banks. Signals originating in the cash storage and processing unit 1213 are also handled by the controller 1208.

As indicated in FIG. 12, the cash docking station 1200 is arranged in a wall 1240 between a first environment 1241 and a second environment 1242. The first and second environment 1241, 1242 may represent a respective non-protected and protected part of a cash center, vehicle, bank or shop etc. Typically, protected entails at least protection from physical access by unauthorized persons and may involve mechanical and electrical barriers. As indicated by the dashed line 1240', the cash docking station 1200 itself may also be configured such that it is divided into a non-protected and protected part, each forming part of the first environment 1241 and second environment 1242, respectively.

In operation, the docking station controller 1208 detects, via the input unit signal connector 1216, that a transport unit 1216 is attached to the cash input unit 1210 and that the cash output unit 1211 is ready to receive cash via the first cash flow path 1215, the cash storage and processing unit 1213 and the second cash flow path 1217. Although not shown in detail in FIG. 12, input 1219, connected to the docking station controller 1208 may be configured to be operated by an operator providing the transport unit 1216, such a keypad and a smart card reader etc. The detection that he cash output unit 1211 is ready to receive cash may, for example, be via the output unit signal connector 1214 or via any other signal communicator, including the keypad 1223 and a network connected entity. Then, by providing signals to engagers 1219 in the transport unit 1216, the engager 1209 of the cash input unit 1210, the cash input unit 1210, the first and second cash flow paths 1215, 1217, the cash storage and processing unit 1213 and the cash output unit 1211, cash is conveyed from the transport unit 1216 and the cash output unit 1260.

The operational control performed by the controller 1208 may further be dependent on an exchange of authentication and authorization information between the transport unit 1216 and the controller 1208. For example, as will be exemplified further below, an operator bringing a transport unit 1216 to the docking station 1200 may be requested to perform an authentication procedure by providing a PIN code via the keypad before the cash input unit 1210 is enabled, by the controller 1208, to connect to the transport unit 1216.

During the conveying of cash, the cash storage and processing unit 1213 may perform a number of operations, including note validation (i.e. detection of potentially counterfeit notes), note fitness sorting, denomination sorting, foreign denomination sorting, detection of facing and orientation.

By configuring the docking station 1200 in a vehicle, such as any of the vehicles 116, 118 in the system depicted in FIG. 1, it is possible to provide a roaming cash center. Such a roaming cash center may perform many of the functions typically performed at a cash center with added advantages such as increased flexibility, speed and security. For example, a roaming cash center with a docking station that is configured to receive cash from transport units and to provide output of cash into typical ATM cash boxes will be able to operate more efficiently. In contrast to prior art operation, such a roaming cash center will spend less time moving from shops where cash is picked up to cash centers where cash is conveyed via docking stations into ATM cash boxes that in turn are transported to ATMs. When operating the docking station in such a scenario, it may be desirable to configure the cash storage and processing unit 1213 to operate as an accumulator of cash, i.e. performing an intermediate storage function, for use during such operations involving re-packing of cash from a first type of transport unit to another type of transport unit.

Turning now to FIGS. 13, 14 and 15, flow of cash and signals in a cash handling system, such as the system 100 described with reference to FIG. 1 and embodiments of system units such as those described with reference to FIGS. 2-12, will now be described in more detail. A central concept that will be used, and in fact has already been briefly mentioned in the description above, is the concept of transactions. A transaction is to be interpreted as a sequence of events that takes place between at least two entities in a cash handling system such as the system 100 described above. During a transaction a transfer of information and/or cash takes place between the involved entities. The duration of a transaction is difficult to specify and may vary within a large interval of time. That is, a transaction may involve actions to be performed manually by a person and also involve exchange of cash and/or information that require acknowledgements from a receiving entity to the providing entity, and if any acknowledging entity is delayed for some reason, the transaction may be delayed for any amount of time. However, a transaction is typically a sequence of information and cash exchanging events that take place during a short time interval.

As briefly discussed above, information that is exchanged between entities during transactions in a cash handling system includes time stamps pertaining to transactions and any other event, identification and authorization information as well as cash amounts. This information is typically data that is stored within memory that form part of control and communication circuitry in the different entities involved in a transaction.

An important concept involved in many transactions is that of ownership of cash. A change of ownership of cash may be a central issue in a transaction and hence be the subject of several exchanges of information signals between different entities in a cash handling system. Ownership of a specified amount of cash is typically registered at a trusted entity in a cash handling system, typically at a bank, in the form of a level of assets that may be claimed by an owner in the form of cash. Hence, the information that is exchanged between entities during transactions in a cash handling system may also include instructions to change ownership of specific amounts, typically corresponding to a specific amount of cash being conveyed between two interacting entities in the cash handling system.

The processing steps, the control steps as well as the signaling steps that are to be described below are typically performed by way of interacting control and communication units in the respective entities in a cash handling system. These control and communication units are provided with one or more computer programs comprising software instructions as described above.

Figure 13A:
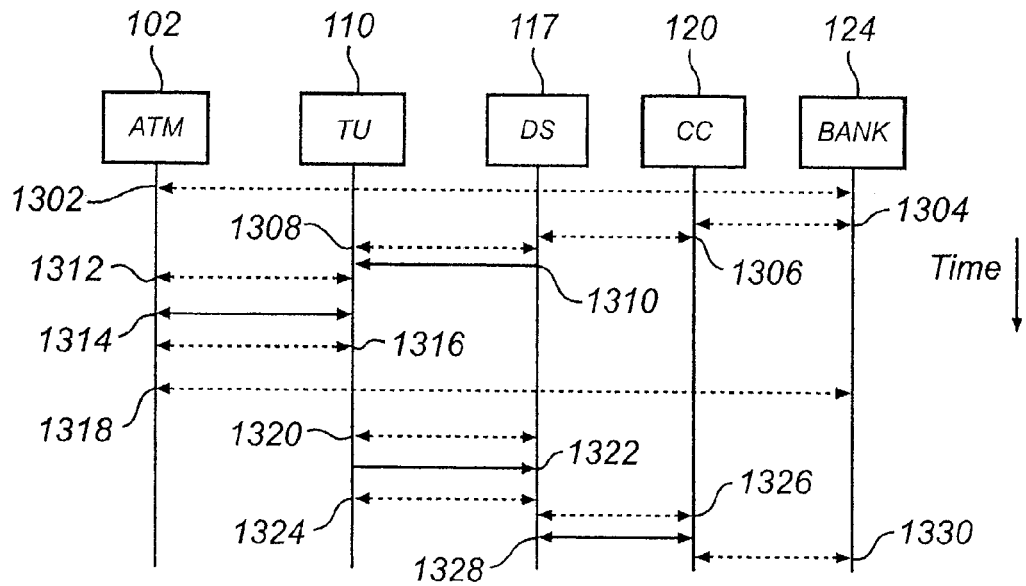
Figure 13B:
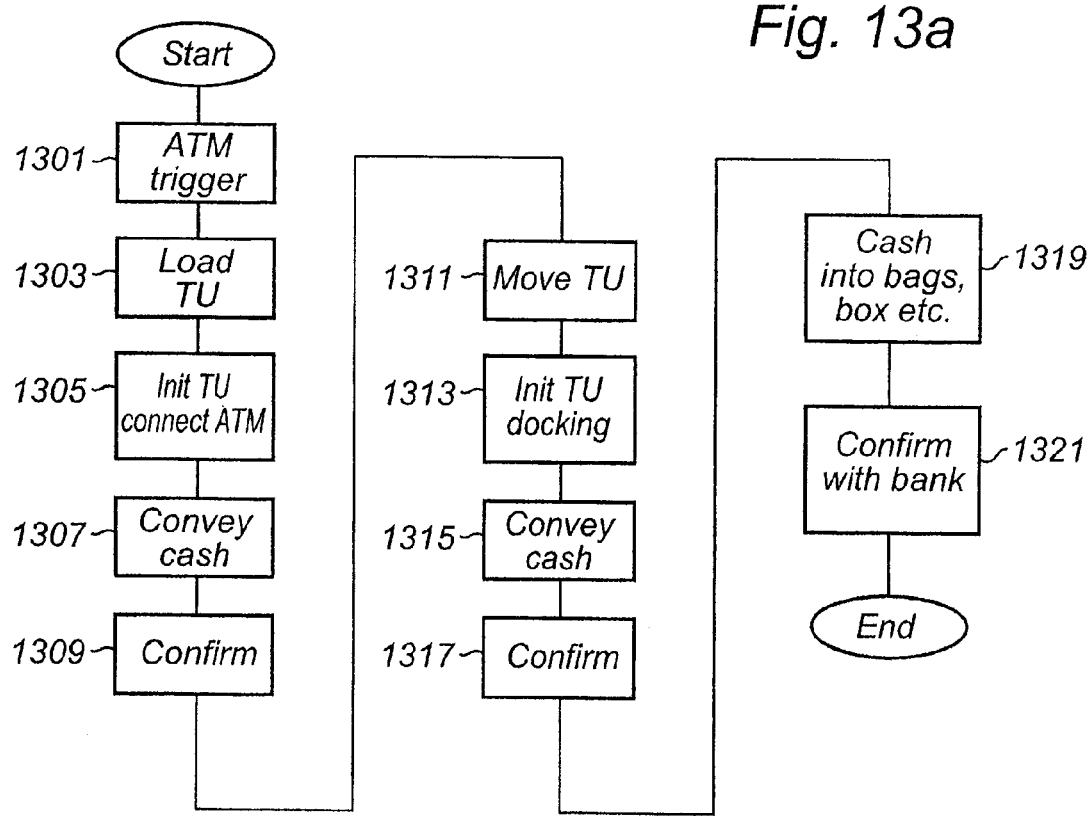

Now, primarily with reference to FIGS. 1, 13a and 13b, a sequence of events and transactions will be described involving flow of cash and flow of information signals in a cash handling system 100. The sequence is initiated at ATM 102, continues via transport unit 110 to docking station 117 in cash center 120 and bank 124. FIG. 13a is a diagram illustrating exchange of signals and cash between the different entities involved and FIG. 13b is a flowchart illustrating the processing and signaling steps performed by the entities.

In a triggering step 1301, the ATM 102 determines by way of sensing and control circuitry (e.g., 411 in FIG. 4) that the ATM's supply of cash is close to being exhausted. The ATM establishes a communication channel with the bank 124 to which it is affiliated and performs a signaling sequence with the bank 124 during which information exchange 1302 takes place. Typically, information that is exchanged includes an ATM identifier and a timestamp indicating an estimated time when the ATM 102 expects to be out of cash.

During the triggering step 1301, the bank 124 establishes a communication channel with the cash center 120 and exchanges information 1304 including an order to provide cash to the ATM 102. Typically, information 1304 that is exchanged between the bank 124 and the cash center 120 includes the ATM identifier, possibly also complemented with the location of the ATM 102, an amount of cash that is to be supplied to the ATM 102 as well as a time indicating when, at the latest, the ATM is to be supplied with the cash. Additionally, the order may also comprise instructions to retrieve, from the ATM, any notes of cash that is unfit for circulation, such as unfit notes not valid for circulation and potentially counterfeit notes. The order from the bank 124 to the cash center 120 to provide cash to the ATM 102 results in that the transport unit 110 is loaded, in a cash loading step 1303, with cash by using the docking station 117 at the cash center 120.

During the cash loading step 1303, communication and control circuitry (e.g., 958 and 904 in FIG. 9) in the docking station 117 and the cash center 120 communicate, during which at least information pertaining to the information 1304 in the order is provided to the docking station 117. The docking station 117 and the transport unit 110, which is mechanically and electrically attached to the docking station 117, then communicate and exchange information 1308 at least pertaining to the information 1304 in the order, whereby the transport unit 110 is made ready to receive cash. If necessary, this information transfer is performed following an appropriate AAA-protocol. Cash 1310 is then conveyed from the docking station 117 to the transport unit 110. Engagers incorporated in respective cash input/output units (e.g., 819 in FIG. 8 and 1209 in FIG. 12) comprised in the transport unit 110 and the docking station 117 interact under supervision of a controller (e.g., 808 in FIG. 8 and 1208 in FIG. 12) in the transport unit 110 and the docking station 117.

After any post-processing such as logging of the cash transfer etc. between the docking station 117 and the transport unit 110, the cash transport unit 110 is then transported to the ATM 102. As exemplified elsewhere in this specification, the actual moving of the cash transport unit 110 may be realized by way of a vehicle or in any other way. If, for example, the cash center 120 is located close to the ATM 102, moving the transport unit 110 may simply entail an operator carrying the transport unit 120 to the ATM 102.

After mechanical attachment and electric connection of the transport unit 120 to the ATM 102, an initiation step 1305 takes place. During the initiation step 1305 exchange of information 1312 is performed between the ATM and the transport unit 110 and the information 1312 is processed in each of the ATM 102 and the transport unit 110 in order to ensure that provision of cash is made possible in accordance with the order previously sent from the bank 124 to the cash center 120. Specifically, a number of operations are performed following an appropriate authentication, authorization and accounting protocol (AAA-protocol). Thereby, the controller (e.g., 808 in FIG. 8) in the transport unit 110 recognizes that the ATM 102 is in fact the designated ATM to which a specific amount of cash is to be provided and that there is no risk of an unauthorized entity receiving the cash.

In a cash conveying step 1307, the specific amount of cash 1314 is conveyed from the transport unit 110 to the ATM and any unfit notes not valid for circulation and potentially counterfeit notes are retrieved from the ATM 102. During this step, engagers (e.g., 409 in FIG. 4 and 819 in FIG. 8) incorporated in respective cash input/output units (e.g., 410 in FIG. 4 and 810 in FIG. 8) comprised in the ATM 102 and the transport unit 110 interact under supervision of a controller (e.g. 408 in FIG. 4 and 808 in FIG. 8) in the ATM 102 as well as the transport unit 110.

Following the cash conveying step 1307 is a confirmation step 1309 during which information 1316 relating to the progress and success of the cash conveying is exchanged between the ATM 102 and the transport unit 110. Typically, the ATM 102 provides information confirming that the amount of cash received from the transport unit 102 is equal to the specific amount of cash that was desired. Such information, typically also including at least a time stamp of the event, is logged and stored in memory (e.g., memory in controllers 408 in FIG. 4 and 808 in FIG. 8) in the ATM 102 as well as in the transport unit 110. Displaying and printing, using a display and a printer (e.g., 419 in FIG. 4), of such logging information is typically also performed and thereby providing, e.g., a written receipt of the transaction to an operator of the transport unit 110. After this information exchange, the input/output units of the ATM 102 and the transport unit 110 are controlled to detach from each other.

During the confirmation step 1309, the ATM 102 exchanges information 1318 with the bank 124. This information exchange typically includes the same information as exchanged between the ATM 102 and the transport unit 110 previously during the confirmation step 1309 as discussed above, having a purpose of providing a confirmation to the bank 124 that the order 1304 sent to the cash center 120 has been performed successfully.

After being mechanically and electrically disengaged from the ATM 102, the transport unit 110 is returned in a movement step 1311 to the cash center 120. Although not illustrated in FIGS. 13a and 13b, the transport unit 110 may have performed any number of procedures providing cash to other ATM's than the ATM 102 as discussed above before performing the return movement 1311 to the cash center 120.

When arriving at the cash center 120, the transport unit is again attached to the docking station 117 and an initiation step 1313 takes place. During this initiation step 1313, the transport unit 110 provides information pertaining to any transactions that have been performed with any ATM. If necessary, this information transfer is performed following an appropriate AAA-protocol.

Then, in a cash conveying step 1315, any remaining cash 1322 in the transport unit 110 is conveyed to the docking station 117, including any unfit notes not valid for circulation and potentially counterfeit notes.

In a confirmation step 1315 information 1324 relating to the progress and success of the cash conveying between the transport unit and the docking station 117 is exchanged, similar to the confirmation step 1309 performed between the transport unit 110 and the ATM. Displaying and printing, using a display and a printer (e.g. 917 in FIG. 9), of such logging information is typically also performed and thereby providing, e.g., a written receipt of the transactions performed by the transport unit 110 to an operator at the cash center. After this information exchange, the input/output units of the transport unit 110 and the docking station 117 are typically controlled to detach from each other.

Operators at the cash center 120 then communicate with the docking station 117, for example via a keypad (e.g. 1223 in FIG. 12) on the docking station or via a cash center communication network (e.g. 906 in FIG. 9 and 1206 in FIG. 12) to which the docking station 117 is connected. During this communication, information 1326 is exchanged, typically regarding amounts of cash stored in the docking station as well as instructions to the docking station 117 to provide and receive cash 1328. For example, instructions may be provided in order to make the docking station 117 output cash into bags or into any other suitable cash container for storage or for further conveying to a bank etc. Instructions may also be provided to the docking station 117 in order to make the docking station 117 receive cash.

Finally, in a confirmation step 1321, the cash center 120 again communicates with the bank 124 and exchanges information 1330, typically pertaining to any transactions performed that relate to previous orders to supply cash to the ATM 102 and any other ATM that has been subject to such ordered cash supply transactions.

Figure 14A:
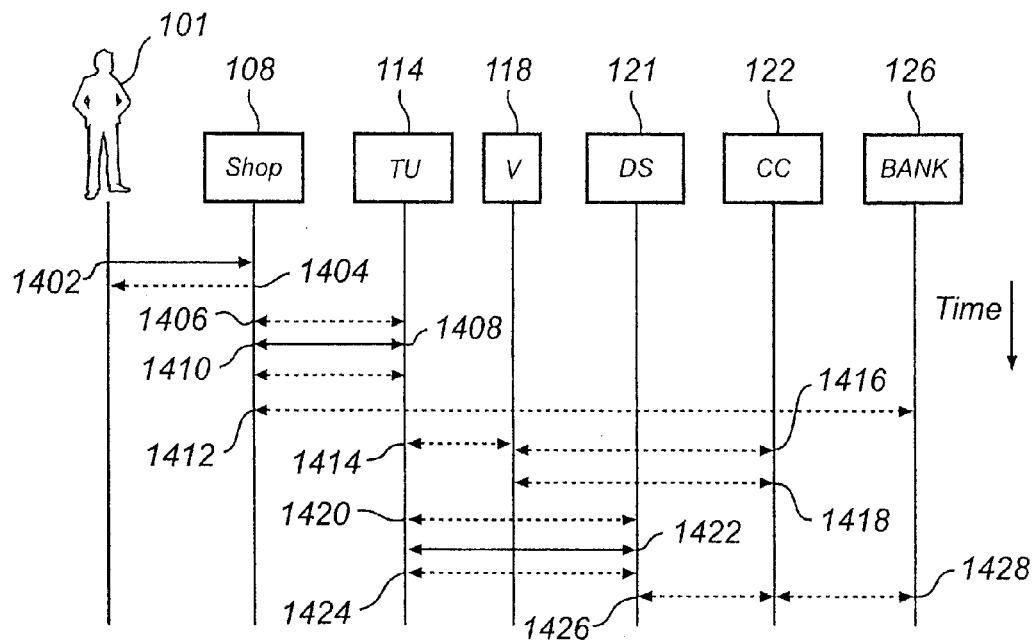
Figure 14B:
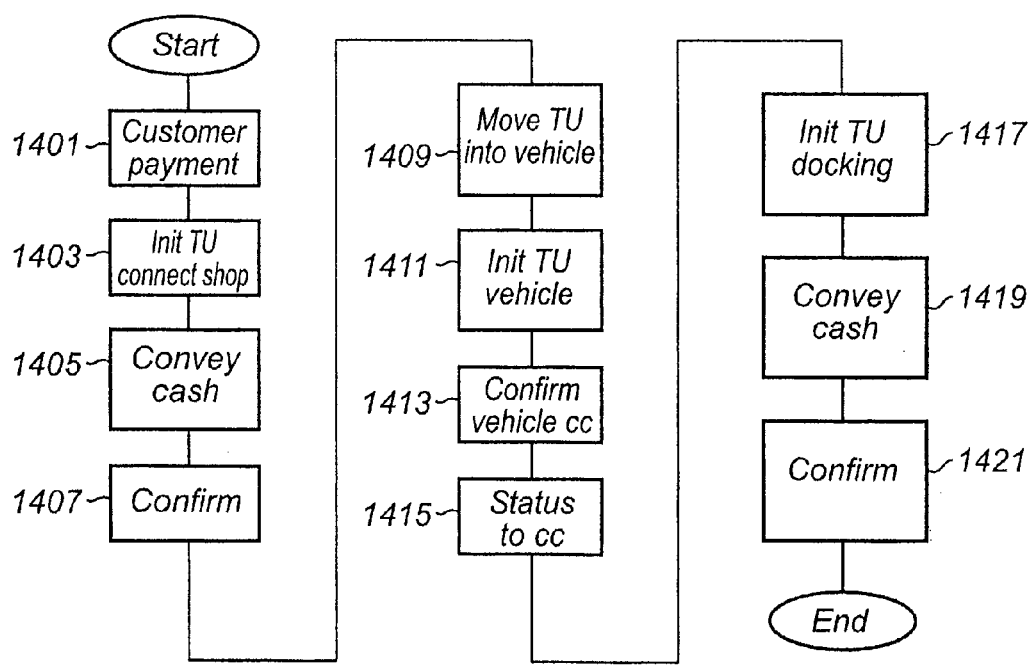

Now, primarily with reference to FIGS. 1, 14a and 14b, a sequence of events and transactions will be described involving flow of cash and flow of information signals in a cash handling system 100, involving also a vehicle such as the vehicle described in connection with FIG. 5. The sequence is initiated at one or more customers 101, paying for articles or services at a shop 108, continues via transport unit 114 and vehicle 118 to cash center 122 and bank 126. FIG. 14a is a diagram illustrating exchange of signals and cash between the different entities involved and FIG. 14b is a flowchart illustrating the processing and signaling steps performed by the involved entities.

The sequence of events begins with a customer payment step 1401, which for the sake of clarity is described as a single step being representative of a large number of customer payments events that, for example, are performed during a period of one day in the shop 108, such as any of the shops described with reference to FIG. 2 and FIG. 3. During the customer payment step 1401, the customer 101 interacts with the shop 108 via a cash handling apparatus and a shop control and communication system, such as any of the cash handling apparatuses 202 and 302 and control and communication systems 204 and 304, as described with reference to FIGS. 2 and 3, respectively. The interaction between the customer 101 and the shop 108 may entail assistance from a teller or the customer may interact without assistance in a "self-checkout" manner. Cash 1402 is provided from the customer 101 to the shop 108 and confirmation information 1404, typically in the form of a receipt of the articles or services paid for, is provided by the shop 108 to the customer 101.

A cash transport unit 114 is then brought to the shop 108 and mechanically and electrically attached to the cash handling apparatus in the shop 108, as discussed above, after which an initiation step 1403 takes place. During the initiation step 1403 exchange of information 1406 is performed between the cash handling apparatus in the shop 108 and the transport unit 114, typically performed following an appropriate AAA-protocol where at least identification information is exchanged in order to authorize the transport unit 114 to receive cash from the cash handling apparatus in the shop 108, and vice versa. The information 1406 further comprises at least data regarding a specific amount of cash that is to be conveyed to the transport unit 114. The information 1406 may also comprise data regarding amounts of cash that is to be conveyed from the transport unit 114 to the cash handling apparatus in the shop 108. For example, the shop 108 may have a particular need for specific denominations of notes or a specific currency. It is typically also desirable to convey unfit notes not valid for circulation and potentially counterfeit notes from the cash handling apparatus in the shop 108 to the transport unit 114. Hence, during the initiation step 1406, the transport unit 114 may confirm that cash is also to be provided to the shop 108, in addition to receiving cash from the shop 108.

Then, in a cash conveying step 1405, the specific amount of cash 1408, including any unfit notes not valid for circulation and potentially counterfeit notes, is conveyed from the cash handling apparatus in the shop 108 to the transport unit 114 and any specific amount of cash 1408 is conveyed from the transport unit 114 to the shop 108. During this step, electric, mechanical and engagers (e.g., 209 in FIG. 2 and 819 in FIG. 8) incorporated in respective cash input/output units (e.g., 210 in FIG. 2 and 810 in FIG. 8) comprised in the cash apparatus in the shop 108 and the transport unit 114 interact under supervision of a controller (e.g. 204 in FIG. 2 and 808 in FIG. 8) in the cash apparatus in the shop 108 as well as the transport unit 114.

Following the cash conveying step 1405 is a confirmation step 1407 during which information 1410 relating to the progress and success of the cash conveying is exchanged between the cash apparatus in the shop 108 and the transport unit 114. Typically, the transport apparatus 114 provides information confirming that the amount of cash received from the cash apparatus in the shop 108 is equal to the specific amount of cash that was negotiated during the initiation step 1403. Such information, typically also including at least a time stamp of the event, is logged and stored in a memory (e.g., memory in the controllers 204 in FIG. 2 and 808 in FIG. 8) in the shop 108 as well as in the transport unit 114. Displaying and printing, using a display and a printer (e.g., 217 in FIG. 2), of such logging information is typically also performed and thereby providing, e.g., a written receipt of the transaction to staff in the shop 108 and to an operator of the transport unit 114. Moreover, during the confirmation step 1407, the shop 108 and the bank 126 establishes a connection and exchanges confirmation information 1412 that at least comprises data pertaining to the conveying of cash between the cash apparatus in the shop 108 and the transport unit 114. Although not explicitly illustrated in FIG. 14a, the transport unit 114 may also take part in this exchange of confirmation information 1412 with the bank 124, for example for the purpose of confirming to the bank 124 that it has received a specific amount of cash from the shop 108. Information that is communicated with the bank 124 may include instructions to change ownership of the specific amount that was conveyed. For example, as a result of the instructions, when these have been acted upon by the bank 124, a bank account belonging to the shop 108 may be credited with the amount of cash that has been conveyed to the transport unit 114.

After this information exchange, the input/output units (e.g., 210 in FIG. 2 and 810 in FIG. 8) of the cash apparatus in the shop 108 and the transport unit 114 are controlled to detach from each other.

In a transport unit moving step 1409, the transport unit 114 is moved into the vehicle 118 for transport to the cash center 122, possibly via further visits to shops where cash is conveyed in procedures similar to the procedure described above with regard to steps 1401 to 1407. In the vehicle 118, which for the purpose of this embodiment is realized by the vehicle 500 described above in connection with FIG. 5, the transport unit 114 is electrically and mechanically connected to the transport unit rack 530.

When connected to the rack 530, the transport unit 114 and the control and communication unit 508 in the vehicle 118 perform an initiation step 1411. During the initiation step 1411, information 1414 is exchanged between the transport unit 114 and the vehicle 118. The information 1414 comprises, in addition to any necessary identification and authentication information with respect to the transport unit 114, information regarding at least pertaining to the transactions performed during steps 1401 to 1407 described above. Hence, identification information regarding shops and amounts of cash conveyed from shops is received by the control and communication unit 508 in the vehicle 118.

In a subsequent confirmation step 1413, the control and communication unit 508 in the vehicle 118 communicates via the radio frequency transceiver unit 532, antenna 533, radio interface 507 and network 506 with the cash center 122. During this communication, information 1416 is exchanged between the vehicle 118 and the cash center 122, the information comprising at least identification information regarding shops and amounts of cash conveyed from shops as described above with reference to steps 1401 to 1407. This confirmation step 1413 is preferably performed within a very short time interval from the steps 1409 and 1411, when the transport unit 114 connects with the vehicle 118, in order to provide the cash center 122 with up to date information that may pertain to the ability to supervise (possibly via the transport service control center 128 as discussed above) the vehicle 118. Such supervision may be terms of security measures to be taken in case of unauthorized access to the vehicle 118 is attempted.

In order to further facilitate for the cash center 122, or the transport service control center 128 acting on instructions from the cash center 122, to supervise the vehicle 118, status information 1418 is exchanged between the vehicle 118 and the cash center 122 during a status reporting step 1415. Needless to say, the status reporting step 1415 may be repeated any number of times during the time the vehicle 118 is conveying cash among entities in the system 100. The status information 1418 may include geographical location information as well as any other security related information.

When the vehicle 118 arrives at the cash center 122, the transport unit 118 is attached to the docking station 121 and an initiation step 1417 takes place. During this initiation step 1417, the transport unit 114 provides information pertaining to any transactions that have been performed with any shop, including the transactions performed with shop 108 as described above with reference to steps 1401 to 1407.

Then, in a cash conveying step 1419, cash 1422 in the transport unit 114 is conveyed to the docking station 121, including any unfit notes not valid for circulation and potentially counterfeit notes.

In a confirmation step 1421 information 1424 relating to the progress and success of the cash conveying between the transport unit and the docking station 121 is exchanged, similar to the confirmation step 1407 performed between the transport unit 114 and the shop 108. Displaying and printing, using a display and a printer (e.g., 917 in FIG. 9), of such logging information is typically also performed and thereby providing, e.g., a written receipt of the transactions performed by the transport unit 114 to an operator at the cash center 122. After this transfer of information 1424, the docking station 121 and the cash center 122 connect with each other and exchanges information 1426, typically information from the docking station 121 reporting and confirming that cash has been received from the transport unit 114. The input/output units (e.g., 810 in FIG. 8 and 1210 in FIG. 12) of the transport unit 114 and the docking station 121 are then typically controlled to detach from each other.

The cash center 122 then connects with the bank 126 and exchanges information 1428, typically summarizing information from the docking station 121 and any other docking station reporting and confirming that cash has been received.

Figure 15A:
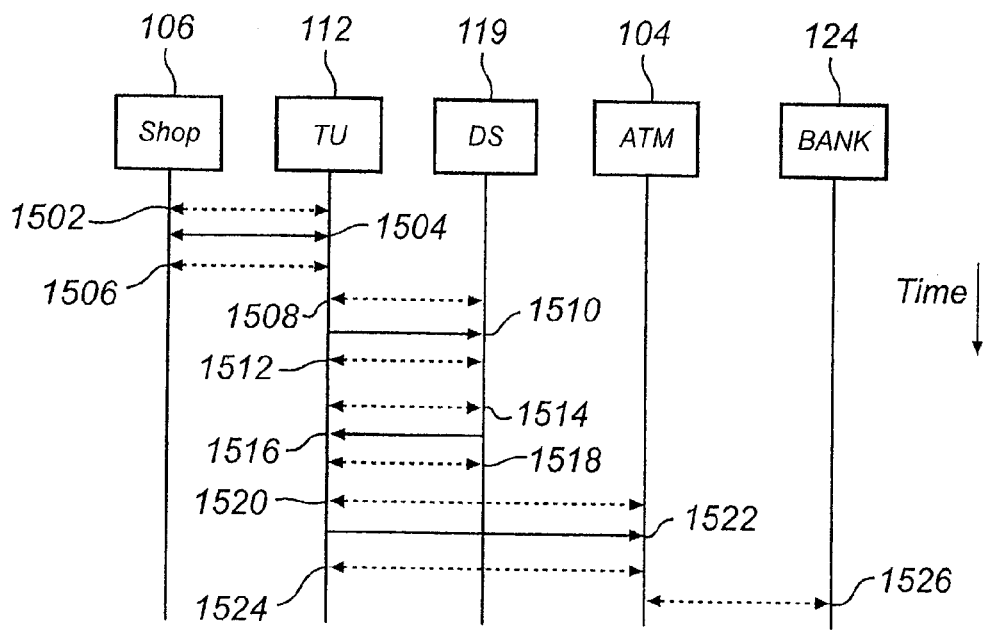
Figure 15B:
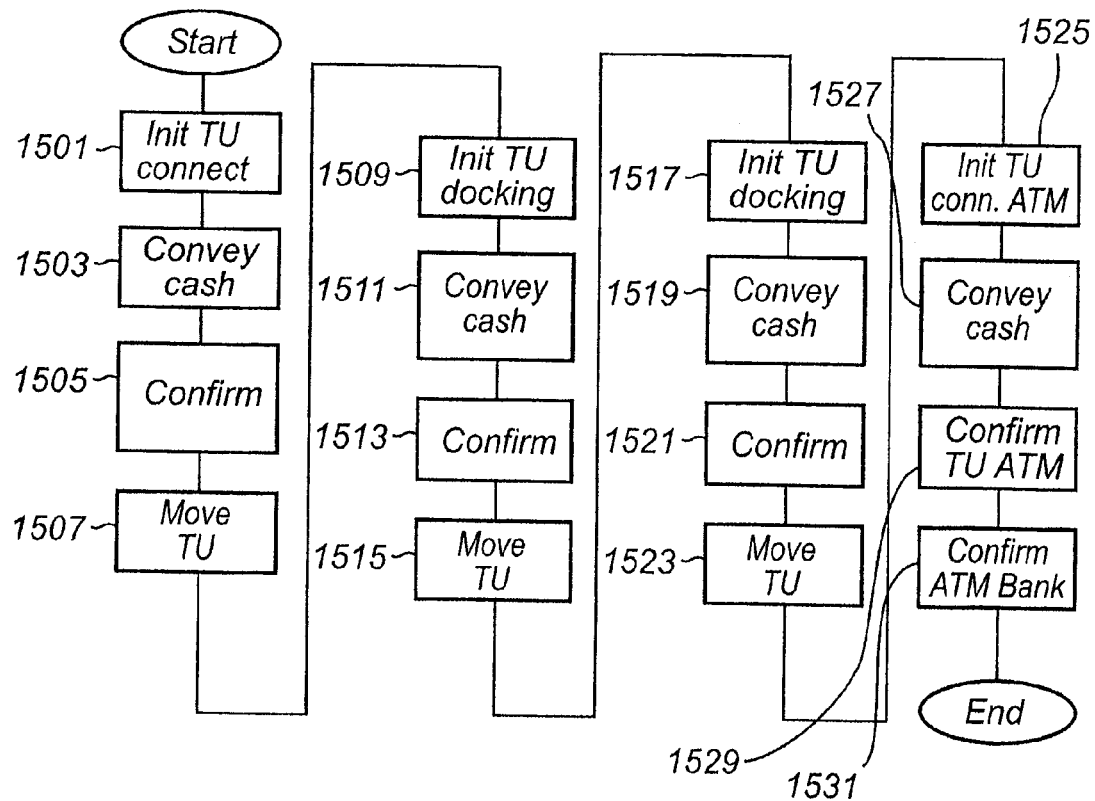

Now, primarily with reference to FIGS. 1, 15a and 15b, a sequence of events and transactions will be described involving flow of cash and flow of information signals in a cash handling system 100. The sequence is initiated at a shop 106, continues via transport unit 112 and docking station 119 to ATM 104. FIG. 15a is a diagram illustrating exchange of signals and cash between the different entities involved and FIG. 15b is a flowchart illustrating the processing and signaling steps performed by the involved entities.

The scenario in which these sequence of events and transactions are part of, is one where the bank 124, with which the ATM 104 is affiliated, and the shop 106 have made an agreement which makes the shop 106 responsible for providing cash to the ATM 104 on a regular basis. Typically, in such a scenario, the ATM 104 is located in or very near the shop 106, thereby avoiding the need for a dedicated cash transport service involving vehicles conveying the cash. The docking station 119 is typically located in a "back office" part of the shop 106 and is under the control and supervision of shop staff.

Prior to the sequence of events and transactions that characterize this embodiment, customers have interacted with the shop 106 via a cash handling apparatus and a shop control and communication system, such as any of the cash handling apparatuses 202 and 302 and control and communication systems 204 and 304, as described with reference to FIGS. 2 and 3, respectively. As in other embodiments described elsewhere, the interactions between the customers and the shop 106 may have entailed assistance from a teller or the customers may interacted without assistance in a "self-checkout" manner. In any case, shop staff has made a decision to remove some or all cash from the cash handling apparatus in the shop 106 by way of the cash transport unit 112.

Hence, the cash transport unit 112 is brought to the shop 106 and mechanically and electrically attached to the cash handling apparatus in the shop 106, for example as discussed above, after which an initiation step 1501 takes place. During the initiation step 1501 exchange of information 1502 is performed between the cash handling apparatus in the shop 106 and the transport unit 112, typically performed following an appropriate AAA-protocol where at least identification information is exchanged in order to authorize the transport unit 112 to receive cash from the cash handling apparatus in the shop 106, and vice versa. The information 1502 further comprises at least data regarding a specific amount of cash that is to be conveyed to the transport unit 112.

Then, in a cash conveying step 1503, the specific amount of cash 1504 is conveyed from the cash handling apparatus in the shop 106 to the transport unit 112. During this step, engagers (e.g., 209 in FIG. 2 and 819 in FIG. 8) incorporated in respective cash input/output units (e.g., 210 in FIG. 2 and 810 in FIG. 8) comprised in the cash apparatus in the shop 106 and the transport unit 112 interact under supervision of a controller (e.g., 204 in FIG. 2 and 808 in FIG. 8) in the cash apparatus in the shop 106 as well as the transport unit 112.

Following the cash conveying step 1503 is a confirmation step 1505 during which information 1506 relating to the progress and success of the cash conveying is exchanged between the cash apparatus in the shop 106 and the transport unit 112. Typically, the transport apparatus 112 provides information confirming that the amount of cash received from the cash apparatus in the shop 106 is equal to the specific amount of cash that was negotiated during the initiation step 1501. Such information, typically also including at least a time stamp of the event, is logged and stored in a memory (e.g., memory in the controllers 204 in FIG. 2 and 808 in FIG. 8) in the shop 106 as well as in the transport unit 112. Displaying and printing, using a display and a printer (e.g., 217 in FIG. 2), of such logging information is typically also performed and thereby providing, e.g., a written receipt of the transaction to staff in the shop 106 and to an operator of the transport unit 112. After this information exchange, the input/output units (e.g., 210 in FIG. 2 and 810 in FIG. 8) of the cash apparatus in the shop 106 and the transport unit 112 are controlled to detach from each other.

In a transport unit moving step 1507, the transport unit 112 is then moved, possibly via further visits to cash handling apparatuses where cash is conveyed in procedures similar to the procedure described above with regard to steps 1501 to 1505, to the back-office docking station 119.

After mechanical and electric attachment of the transport unit 112 to the docking station 119, an initiation step 1509 takes place. During this initiation step 1509, the transport unit 112 provides information 1508 pertaining to any transactions that have been performed with any cash handling apparatus in the shop 106, including the transactions performed as described above with reference to steps 1501 to 1505. Typically, this transfer of information 1508 is performed following an appropriate AAA-protocol.

Then, in a cash conveying step 1511, cash 1510 in the transport unit 114 is conveyed to the docking station 119, including any unfit notes not valid for circulation and potentially counterfeit notes. The cash is stored in the docking station 119 for later retrieval and conveying to the transport unit 112 or any other transport unit authorized to connect with the docking station 119.

In a confirmation step 1513 information 1512 relating to the progress and success of the cash conveying between the transport unit 112 and the docking station 119 is exchanged, similar to the confirmation step 1506 performed between the transport unit 112 and the cash handling apparatus in the shop 106. Displaying and printing, using a display and a printer (e.g., 217 in FIG. 2), of such logging information is typically also performed and thereby providing, e.g., a written receipt of the transactions performed by the transport unit 112 to shop staff.

After receiving direct instructions from the bank 124 or by acting in accordance with agreed procedures, shop staff is now to perform a procedure of refilling the ATM 104 with cash. Needless to say, the time at which this refilling is ordered may vary depending on the specific situation. Information regarding the refilling procedure, such as the amount of cash that the ATM 104 requires, may form part of direct instructions or may be stipulated in accordance with agreed procedures. A simple example of an agreed procedure may entail that the shop 106 (i.e. shop staff) is to refill the ATM 104 once every day with as much cash as a cash storage unit (e.g., 415 in FIG. 4) in the ATM 104 can store.

During an initiation step 1517, the docking station 119 and the transport unit 112, which has been mechanically and electrically connected to the docking station 119, communicate and exchange information 1514. As exemplified above, the information 1514 includes at least an identifier of the transport unit and typically also information regarding the amount of cash that is to be conveyed. The transfer of information 1514 is typically performed following an appropriate AAA-protocol. This results in that the transport unit 112 is made ready to receive cash. Cash 1516 is then conveyed from the docking station 119 to the transport unit 112 in a cash conveying step 1519 during which engagers (e.g., 309 in FIG. 3 and 819 in FIG. 8) incorporated in respective cash input/output units (e.g., 360 in FIG. 3 and 810 in FIG. 8) comprised in the transport unit 112 and the docking station 119 interact under supervision of a controller (e.g., 358 in FIG. 3 and 808 in FIG. 8) in the transport unit 112 and the docking station 119.

After a confirmation step 1521, during which information 1518 regarding the previously performed conveying 1519 of cash 1516 between the docking station 117 and the transport unit 110 is exchanged, the cash transport unit 112 is transported to the ATM 104 during a movement step 1523. Moving the transport unit 112 typically entails a shop staff carrying the transport unit 112 to the ATM 104.

After mechanical attachment and electric connection of the transport unit 112 to the ATM 104, an initiation step 1525 takes place. During the initiation step 1525 exchange of information 1520 is performed between the ATM and the transport unit 112 and the information 1520 is processed in each of the ATM 104 and the transport unit 112 in order to ensure that provision of cash is made possible in accordance with the instructions previously received, either directly from the bank 124 or indirectly in accordance with an agreement between the shop 106 and the bank 124. Typically, a number of operations are performed following an appropriate authentication, authorization and accounting protocol (AAA-protocol). Thereby, the controller (e.g., 808 in FIG. 8) in the transport unit 112 recognizes that the ATM 104 is in fact the designated ATM to which an amount of cash is to be provided and that there is no risk of an unauthorized entity receiving the cash. Although the amount of cash to be provided to the ATM 104 may have been specified in terms of a predetermined sum, the amount of cash may also be unspecified, or possibly only be specified as an upper limit. If left unspecified, cash conveying is to be performed until the ATM 104 is fully loaded with cash.

In a cash conveying step 1527, the cash 1522 is conveyed from the transport unit 112 to the ATM 104. Additionally, any unfit notes not valid for circulation and potentially counterfeit notes may be retrieved from the ATM 104 into the transport unit 112. During this step, engagers (e.g., 409 in FIG. 4 and 819 in FIG. 8) incorporated in respective cash input/output units (e.g., 410 in FIG. 4 and 810 in FIG. 8) comprised in the ATM 104 and the transport unit 112 interact under supervision of a controller (e.g., 408 in FIG. 4 and 808 in FIG. 8) in the ATM 104 as well as the transport unit 112.

Following the cash conveying step 1527 is a confirmation step 1529 during which information 1524 relating to the progress and success of the cash conveying 1527 is exchanged between the ATM 104 and the transport unit 112. Typically, the ATM 104 provides information confirming the amount of cash received from the transport unit 102 is equal to the amount of cash that was desired. Such information, typically also including at least a time stamp of the event, is logged and stored in a memory (e.g., memory in the controllers 408 in FIG. 4 and 808 in FIG. 8) in the ATM 104 as well as in the transport unit 112. Displaying and printing, using a display and a printer (e.g., 419 in FIG. 4), of such logging information is typically also performed and thereby providing, e.g., a written receipt of the transaction to the shop staff operating the transport unit 112. After this information exchange, the input/output units of the ATM 104 and the transport unit 112 are controlled to detach from each other.

Finally, during a confirmation step 1531, the ATM 104 exchanges information 1526 with the bank 124. This information exchange typically includes the same information as exchanged between the ATM 104 and the transport unit 112 previously during the confirmation step 1529 as discussed above, having a purpose of providing a confirmation to the bank 124 that the shop 106 has performed in accordance with instructions.

A variation of the procedure described above in connection with FIGS. 15*a* and 15*b* is one in which steps 1509 to 1523 are omitted. That is, after conveying cash from the shop 106 to the transport unit 112, the steps involving docking of the transport unit 112 with the docking station 119 may be omitted. In such a procedure, the transport unit 112 is immediately moved from the shop 106, after having received cash from a cash handling apparatus, to the ATM 104 and the procedure continuing directly with steps 1525 to 1531, as described above.

The foregoing description of the invention illustrates and describes various embodiments of the present invention. As various changes could be made in the above construction without departing from the scope of the invention, it is intended that all matter contained in the above description or shown in the accompanying drawings shall be interpreted as illustrative and not in a limiting sense. Furthermore, the scope of the present invention covers various modifications, combination, alterations, etc., of the above-described embodiments that are within the scope of the claims. Additionally, the disclosure shows and describes only selected embodiments of the invention, but the invention is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiments may be selectively interchanged and applied to other illustrated and non-illustrated embodiments of the invention without departing from the scope of the invention.

The invention claimed is:

1. A docking station for use in a note handling system, the docking station comprising:
   a note input unit for receiving notes from a first note transport unit;
   a note output unit for providing notes to a second note transport unit,
   a signal communicator for exchanging information with at least one of said first note transport unit and said second note transport unit; and
   a controller for controlling operation of said signal communicator, said note input unit, and said note output unit,
   wherein said note input unit is positioned for access from a first environment representing a first level of security and wherein said note output unit is positioned for access from a second environment representing a second level of security higher than said first level of security.

2. The docking station according to claim 1, wherein said signal communicator is arranged to exchange information with both said first note transport unit and said second note transport unit.

3. The docking station according to claim 1, wherein the docking station comprises a non-protected part being accessible from the first environment and a protected part being accessible from the second environment, wherein the note input unit is in the non-protected part and the note output unit is in the protected part.

4. The docking station according to claim 1, positioned in a wall at a cash center, said wall being positioned between said first environment and said second environment.

5. The docking station according to claim 1, positioned in a wall in a vehicle.

6. The docking station according to claim 3, further comprising a note storage and processing unit.

7. The docking station according to claim 6, wherein said note storage and processing unit is in the protected part of the docking station.

8. The docking station according to claim 6, wherein said cash storage and processing unit is configured to perform the operation note fitness sorting.

9. The docking station according to claim 6, wherein said cash storage and processing unit is configured to perform the operation of denomination sorting.

10. The docking station according to claim 6, wherein said cash storage and processing unit is configured to perform the operation of foreign currency sorting.

11. The docking station according to claim 6, wherein said cash storage and processing unit is configured to perform the operation of note validation.

12. A docking station as claimed in claim 1, said docking station, said first note transport unit, and said second note transport unit forming part of a cash handling system which further comprises a recycling-type point-of-sale note handling apparatus, said note handling apparatus interacting with said first note transport unit.

13. The docking station according to claim 1, further comprising a note flow path between the note input unit and the note output unit, wherein the note flow path connects the note input unit to the note output unit.

14. The docking station according to claim 13, further comprising a note storage and processing unit, wherein the note flow path comprises a first note flow path between the note input unit and the note storage and processing unit, and a second note flow path between the note storage and processing unit and the cash output unit.

* * * * *